United States Patent
Wang

(10) Patent No.: US 10,782,943 B1
(45) Date of Patent: *Sep. 22, 2020

(54) ENCODING DATA AND METADATA FOR RUN-TIME CHECKING OF COMPUTER CODE AND DATA SERIALIZATION

(71) Applicant: Ning Wang, Foster City, CA (US)

(72) Inventor: Ning Wang, Foster City, CA (US)

(73) Assignee: STENSAL, INC., Foster City, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/947,883

(22) Filed: Apr. 9, 2018

Related U.S. Application Data

(63) Continuation of application No. 13/899,236, filed on May 21, 2013, now Pat. No. 9,971,575, which is a continuation of application No. 12/857,292, filed on Aug. 16, 2010, now Pat. No. 8,448,153.

(60) Provisional application No. 61/256,148, filed on Oct. 29, 2009.

(51) Int. Cl.
*G06F 8/41* (2018.01)

(52) U.S. Cl.
CPC ............................ *G06F 8/41* (2013.01)

(58) Field of Classification Search
CPC . G06F 8/41; G06F 8/437; G06F 21/12; G06F 21/51
USPC ................................ 717/146, 143, 153, 162
See application file for complete search history.

(56) References Cited

U.S. PATENT DOCUMENTS

| | | |
|---|---|---|
| 5,175,856 A | 12/1992 | Van Dyke et al. |
| 5,583,988 A | 12/1996 | Crank et al. |
| 5,590,329 A | 12/1996 | Goodnow, II et al. |
| 5,659,753 A | 8/1997 | Murphy et al. |
| 5,790,778 A | 8/1998 | Bush et al. |
| 6,085,029 A | 7/2000 | Kolawa et al. |
| 6,983,448 B2 | 1/2006 | Hartel et al. |
| 7,219,330 B2 | 5/2007 | Hogg et al. |
| 7,284,241 B2 | 10/2007 | Heishi et al. |
| 7,627,862 B2 | 12/2009 | Chen |
| 7,707,547 B2 | 4/2010 | Colton et al. |
| 8,146,096 B2 | 3/2012 | Angelov et al. |
| 8,448,153 B1 | 5/2013 | Wang |
| 2006/0190932 A1 | 8/2006 | Gilbert |
| 2007/0174288 A1 | 7/2007 | Stoyanova |
| 2011/0131548 A1 | 6/2011 | Colton et al. |

OTHER PUBLICATIONS

S Kaufer, R Lopes, S Pratap, "Saber-C: an Interpreter-based programming environment for the C language", Proceedings of the Summer Usenix Conference, Jun. 20-24, 1988.

J.L.Steffen, "Adding Run-Time Checking to the Portable C Compiler", Software—Practice & Experience, pp. 305-316, 1992.

Richard W. M. Jones, Paul H. J. Kelly, "Backwards-compatible bounds checking for arrays and pointers in C programs", Proceedings of the Third International Workshop on Automated and Algorithmic Debugging, pp. 13-26, 1997.

(Continued)

*Primary Examiner* — Vanel Frenel
(74) *Attorney, Agent, or Firm* — Nixon & Vanderhye PC

(57) ABSTRACT

A method and system encodes data objects and their metadata. An implementation provides a method and system for rewriting a program to encode metadata in the run-time environment of the program. An implementation provides a method for serializing a data object according to the encoding method and a method for deserializing a bit sequence that is generated by the serialization method.

25 Claims, 17 Drawing Sheets

(56) References Cited

OTHER PUBLICATIONS

Jeremy Condit, Matthew Harren, Scott McPeak, George C. Necula, Westley Weimer, "CCured in the Real World", Proceedings of the ACM SIGPLAN 2003 Conference on Programming Language Design and Implementation, pp. 232-244, 2003.
George C. Necula, Jeremy Condit, Matthew Harren, Scott Mcpeak, Westley Weimer, "CCured: Type-Safe Retrofitting of Legacy Software", ACM Transaction on Programming Languages and Systems, vol. 27, 2005.
Wei Xu, Daniel C. Duvarney, R. Sekar, "An Efficient and Backwards-Compatible Transformation to Ensure Memory Safety of C Programs", Proceedings of the 12th ACM SIGSOFT International Symposium on Foundations of Software Engineering, pp. 117-125, 2004.
S.H. Yong, S_ Horwitz, "Protecting C programs from attacks via invalid pointer dereferences"—Proceedings of the 9th European Software Engineering Conference, pp. 307-316, 2003.
Todd Austin, Scott Breach, Gurindar Sohi, "Efficient detection of all pointer and array access errors", Proceedings of SIGPLAN'94 Conference on Programming Languages Design and Implementation, pp. 290-301, 1994.
Oiwa Yutaka, Tatsurou Sekiguchi, Eijiro SUM11, Akinori Yonezawa, "Fail-Safe ANSI-C Compiler: An Approach to Making C Programs Secure", Proceedings of International Symposium on Software Security, pp. 133-153, 2002.
Olatunji Ruwase, Monica S_ Lam, "A practical dynamic buffer overflow detector", Proceedings of the 11th Network and Distributed System Security Symposium, 2004.
Santosh Nagarakatie, Jianzhou Zhao, Milo M.K. Martin, Steve Zdancewic, "SoftBound: highly compatible and complete spatial memory safety for C", Proceedings of the 2009 ACM SIGPLAN Conference on Programming Language Design and Implementation, pp. 245-258, 2009.

ENCODING DATA AND METADATA FOR RUN-TIME CHECKING OF COMPUTER CODE AND DATA SERIALIZATION

CROSS-REFERENCE TO RELATED APPLICATIONS

This patent application is a continuation of U.S. patent application Ser. No. 13/899,236, filed May 21, 2013, which is a continuation of U.S. patent application Ser. No. 12/857,292, filed Aug. 16, 2010, issued as U.S. Pat. No. 8,448,153, on May 21, 2013, which claims the benefit of U.S. provisional application 61/256,148, filed Oct. 29, 2009, which are incorporated by reference along with all other references cited in this application.

BACKGROUND OF THE INVENTION

The invention generally relates to computers and computer data and metadata of computer data. In particular, the invention provides a method and system for encoding data and metadata, for example, to support run-time checking in programming languages and to serialize computer data.

The information age has been made possible by computers and the software that executes on the computers. There are many types of software and software is used in many industries including business, commerce, education, law, entertainment, medicine, finance, mathematics, energy, and many others. To write software, programmers use programming languages to write their code and compilers to compile their code (or interpreters to execute their code). Some examples of programming languages include C, C++, C#, Java, ML, Ocaml, Haskell, JavaScript, Cobol, Fortran, Prolog, Pascal, Ada, Fourth, Basic, Perl, Ruby, Python, and many others. Despite the widespread success of programming languages and their compilers or interpreters, there are vulnerabilities in programming languages and their compiled code that lead to potential security flaws and others problems.

Programs written in type unsafe programming languages such as C, C++, and assembly languages do not keep the metadata (including but not limited to type information) of their data in their run-time environments. Without metadata, run-time checking may not be performed to verify whether the use of data is actually consistent with their metadata or not.

The lack of run-time checking in type unsafe programming languages such as C, C++, and assembly languages may compromise the security, integrity, and reliability of the computer systems that run the programs written in these programming languages. For example, in type unsafe programming languages, a buffer may be written or read with more data than the buffer can hold due to these languages do not check whether the write or read of the buffer is within the boundary of the buffer or not at run-time. This phenomenal is normally called buffer overrun or buffer overflow. Hackers can intentionally cause buffer overrun to break into systems, inject malicious programs, and/or obtain super user privileges from user-level accounts.

When a computer system runs a program that can overrun its buffers, the computer system is vulnerable to buffer overrun attacks. Since 1988 when the Morris internet worm attacked computer systems by taking advantage of buffer overrun vulnerabilities in a computer program—fingered (written in C)—buffer overrun based attacks have become prevalent threats to the security, integrity, reliability of computer systems worldwide. On average, every third computer security attack is based on exploiting buffer overrun vulnerabilities (statistics from 2000 to 2007). The Blaster worm remediation cost an average of $475,000 per company and with larger companies reporting up to $4.2 million. The conficker worm is estimated to have breached 16 million computers as of February 2009.

In addition to the buffer overrun vulnerability, there are many other vulnerabilities in C/C++/Assembly Languages. With existing vulnerabilities unchecked and new vulnerabilities being introduced in the future, and without viable solutions to prevent future program vulnerabilities from being exploited, the number and economic cost of attacks to computer systems will continue to increase.

Therefore, there is a need for a method and system of encoding data objects and their metadata to support run-time checking of computer code. Run-time checking can either terminate the execution of computer code when errors occur or produce information about the execution of computer code.

BRIEF SUMMARY OF THE INVENTION

A method and system encodes data objects and their metadata to support run-time checking of computer code. A technique rewrites a program to encode metadata in the run-time environment of the program and to add run-time checks. The rewritten program reserves one or more metadata sections that encodes metadata for each data section that encodes a data object.

These sections may be contiguous in memory or separate noncontiguous memory regions. A set of functions can be used to map or reference data in the different sections. Run-time checking is performed using these sections in memory.

According to an approach, we make metadata available at the run-time environments of the type unsafe programming languages. Then run-time checking can be performed to verify whether the use of data is consistent with its metadata or not. Hence vulnerabilities such as buffer overrun can be prevented at run-time.

In an implementation, a technique for encoding a data object and its metadata includes of the following steps: (1) using the native representation or any binary representation of the data object as a consecutive bit sequence-Data Section (DSECT); (2) encoding its metadata in one consecutive bit sequence that comprises of multiple subsections. The first subsection is named as Metadata Section 1 (MSECT1), the second subsection is named as MSECT2, and so on. The nth subsection is named as MSECTn; (3) adding a header— Head Section (HSECT)—that comprises of the encoding of the size of the DSECT and the encoding of a set of mapping functions. Each of the mapping functions maps the location of a bit sequence that encodes a subobject in the DSECT to the location of a bit sequence that is part of the encoding of the metadata of the subobject in a MSECT.

The HSECT, DSECT, and MSECTs of a data object can be mapped to a consecutive memory region in the run-time environment of a program. The storage used for the data object and its the metadata is thus allocated together. There is no need to inject extra code into the program to allocate storage for metadata.

Alternatively, the HSECT, DSECT, and MSECTs of a data object can be concatenated into one consecutive bit sequence as the serialized version of the data object. Sharing the data object between homogenous computing environments is optimized because the DSECT of the bit sequence is the in-memory representation of the data object.

In a specific implementation, a data object refers to a value of a primitive type (e.g., integer and pointer), a value of an aggregate data type (e.g., array, structure, and class), a value of a union type, or a collection of any data in memory or external storage. A data object of a primitive type has one subobject that is itself. For a data object of an aggregate data type (or union type), its direct or transitive composing elements are subobjects of this aggregate (or union) data object.

Any data describing the properties of a data object can be the metadata of the data object. Each subobject of a data object can have its own metadata. The metadata of a data object comprises of the metadata of the subobjects of the data object.

Generally described, an embodiment provides a method and system for rewriting a program to encode metadata in the run-time environment of the program and to add run-time checks to the program by: (1) rewriting the data object allocation constructs to augment each data object with a HSECT and multiple MSECTs, (2) adding extra instructions to store HSECTs and MSECTs with the metadata of data objects, (3) adding extra instructions to load metadata from HSECTs and MSECTs, and (4) adding extra instructions to check whether the use of each data object is consistent with its metadata or not.

In additional, another embodiment includes (1) a method for serializing a data object to a bit sequence that comprises of a HSECT, a DSECT that encodes the data object, and multiple MSECTs that encode the metadata of the data object. The resulting bit sequence is the serialized version of the data object; (2) a method for deserializing a bit sequence that is generated by the serialization method. It resurrects a data object from the bit sequence in a DSECT by checking the metadata encoded in MSECTs.

In an implementation, a method includes: receiving a first intermediate language code that is a conversion of computer source code, where the first intermediate language code comprises a plurality of metadata generated during the conversion of the computer source code; and rewriting the first intermediate language code into a second intermediate language code. The rewriting including: writing into the second intermediate language code code to reserve a first header section for a first data object, specified in the first intermediate language code, where the first data object has a first size and is associated with first metadata of the plurality of metadata; writing into the second intermediate language code code to reserve a first metadata section; writing into the second intermediate language code code to reserve a second metadata section; writing into the second intermediate language code code to store the first metadata into the first and second metadata sections; and writing into the second intermediate language code code to load the first metadata from the first and second metadata sections.

In various implementations, the method further includes any one or combination of the following: generating executable code from second intermediate language code. The first intermediate language code includes a conversion of computer machine code. In an implementation, a method of performing run-time checking during execution of executable code generated according to the method described above.

The method further includes any one or combination of the following: writing into the second intermediate language code code to store the first size into the header section. The first header section is reserved in memory before the first data object, the first metadata section is reserved in memory after the first data object, and the second metadata section is reserved in memory after the first metadata section. The first header section is reserved in memory at a location before the first data object, the first metadata section is reserved in memory at a location before the first header section, and the second metadata section is reserved in memory at a location before the first metadata section.

The method further includes any one or combination of the following: when writing the second intermediate language code, referring to a look-up table comprising rules to convert one or more instructions found in the first intermediate language code to one or more corresponding instructions for the second intermediate language code.

The method further includes any one or combination of the following: encoding a n-bit value type of the first intermediate language code as at most n bits in the second intermediate language; encoding n-bit uninitialized memory type of the first intermediate language code as at most n bits in the second intermediate language.

The method further includes any one or combination of the following: reserving a unique bit pattern in the first 8 bits of a type encoding, where the unique bit pattern for the first 8 bits is different from a bit pattern used for a remainder of bits in the type encoding. The method includes: reserving a unique bit pattern in the last 8 bits of a type encoding, where the unique bit pattern for the last 8 bits is different from a bit pattern used for a remainder of bits in the type encoding.

The method further includes any one or combination of the following: rewriting a v1=malloc(v2) instruction of the first intermediate language code to instructions of the second intermediate language code comprising v0=malloc(4+ 3*v2); store(v0,4,v2); v1=v0+4, and for(int i=0; i<v2; ++i) store(v1+i+v2, 1, UI8). A method of detecting a buffer overrun situation or a type error situation by using code according to the method of described above.

In an implementation, a method of rewriting the first intermediate language code into a second intermediate language code includes: writing into the second intermediate language code code to reserve a first header section for a first data object, specified in the first intermediate language code, where the first data object has a first size and is associated with a first metadata of a plurality of metadata associated with the first intermediate language code; writing into the second intermediate language code code to reserve a first metadata section; writing into the second intermediate language code code to reserve a second metadata section; writing into the second intermediate language code code to store the first metadata into the first and second metadata sections; and writing into the second intermediate language code code to load the first metadata from the first and second metadata sections.

In various implementations, a data subobject at a offset in the first data object is separated from a first data subobject metadata, associated with the data subobject, in the first metadata section by a second offset, and the first data subobject metadata is separated from a second data subobject metadata, associated with the data subobject, in the second metadata section by a third offset. The first offset is equal to the second offset, and the first offset is equal to the third offset.

The method further includes any one or combination of the following: writing into the second intermediate language code code to store the first size into the header section. The first offset is not equal to the second offset, and the first offset is not equal to the third offset.

The method further includes any one or combination of the following: writing into the second intermediate language code code to store a first function into the header section, where using the first function, given the first offset, the first function provides the second offset; and writing into the second intermediate language code code to store a second function into the header section, where using the second function, given the first offset, the second function provides the third offset.

The method further includes any one or combination of the following: writing into the second intermediate language code code to reserve a third metadata section; writing into the second intermediate language code code to store the first metadata into the third metadata section; and writing into the second intermediate language code code to load the first metadata from the third metadata section.

In an implementation, a system to compile source code includes: a source code front-end component, connected to receive source code, the source code front-end generating first intermediate language code based on the source code received; and a rewriter component, connected to receive the first intermediate language code generated by the source code front-end, the rewriter generating second intermediate language code from the first intermediate language code.

The rewriter writes into the second intermediate language code code to reserve a first header section for a first data object, specified in the first intermediate language code, where the first data object has a first size and is associated with first metadata of the plurality of metadata.

The rewriter writes into the second intermediate language code code to reserve a first metadata section having a second size. The rewriter writes into the second intermediate language code code to reserve a second metadata section having a third size.

The system includes a code generator component, connected to receive the second intermediate language code generated by the rewriter, the code generator generating executable code, whereby the executable code performs runtime checking to detect a buffer overrun situation or a type error situation. The rewriter writes into the second intermediate language code code to store the first metadata into the first and second metadata sections. The rewriter writes into the second intermediate language code code to load the first metadata from the first and second metadata sections. The second size is the same as the first size, and the third size is the same as the first size.

In an implementation, a method includes: receiving a data object of computer software code; and using a computer processor, encoding the data object. The encoding including: reserving a data section starting at a first location in a computer memory and ending at a second location in the computer memory, where a first size of the data section, from the first location to the second location, is at least a size of the data object; reserving a first metadata section, associated with the data object, starting at a third memory location, subsequent in the computer memory to the second location, and ending at a fourth location in the computer memory, where a second size of the first metadata section, from the third location to the fourth location, is equal to the first size; and reserving a second metadata section, associated with the data object, starting at a fifth memory location, subsequent in the computer memory to the fourth location, and ending at a sixth location in the computer memory, where a third size of the second metadata section, from the fifth location to the sixth location, is equal to the first size.

The data object includes reserving a header section at a seventh location in the computer memory, before the first location, where the first size is stored in the header section.

In an implementation, a method includes: receiving a data object of computer software code, where the data object comprises a first size; and using a computer processor, encoding the data object. The encoding including: reserving a data section starting at a first location in a computer memory and ending at a second location in the computer memory, where the data section, from the first location to the second location, includes a second size that is at least equal to the first size; reserving a first metadata section, associated with the data object, starting at a third memory location, subsequent in the computer memory to the second location, and ending at a fourth location in the computer memory, where the first metadata section, from the third location to the fourth location, comprises a third size; and reserving a header section starting at a fifth location in the computer memory, before the first location, where the header section comprises a value equal to the second size.

The header section ends at a sixth location, the header section includes a function which when input a distance from sixth location to a seventh location in the data section, the function outputs an offset value, and the sixth location plus the offset value is a location in the first metadata section of metadata corresponding to data stored at the seventh location. The encoding the data object includes: reserving a second metadata section, associated with the data object, starting at a eighth memory location, subsequent in the computer memory to the fourth location, and ending at a ninth location in the computer memory, where the second metadata section, from the eighth location to the ninth location, comprises the third size.

In an implementation, the method includes: receiving a data object of computer software code, where the data object has a first size; using a computer processor, encoding the data object. The encoding including: reserving a data section starting at a first location in a computer memory and ending at a second location in the computer memory, where the data section, from the first location to the second location, comprises a second size that is at least equal to the first size; reserving a first metadata section, associated with the data object, starting at a third memory location, subsequent in the computer memory to the second location, and ending at a fourth location in the computer memory, where the first metadata section, from the third location to the fourth location, has a third size; and reserving a header section starting at a fifth location in the computer memory, before the first location; and storing at a sixth location in the data section a first data value; storing an encoded first metadata value corresponding to the first data value at a seventh location in the first metadata section; and decoding the first data value based on the first metadata value.

When the first metadata value is a first encoding type value, decode the first data value as a value of the first encoding type. When the first metadata value is a second encoding type value, different from the first encoding type value, decode the first data value as a value of the second encoding type.

In an implementation, a system to compile source code includes: a machine code front-end component, connected to receive executable machine code, the machine code front-end generating first intermediate language code based on the machine code received; and a rewriter component, connected to receive the first intermediate language code generated by the machine code front-end, the rewriter generating second intermediate language code from the first intermediate language code.

The rewriter writes into the second intermediate language code code to reserve a first header section for a first data object, specified in the first intermediate language code, where the first data object has a first size and is associated with first metadata of the plurality of metadata.

The rewriter writes into the second intermediate language code code to reserve a first metadata section having a second size. The rewriter writes into the second intermediate language code code to reserve a second metadata section having a third size.

The system includes a code generator component, connected to receive the second intermediate language code generated by the rewriter, the code generator generating executable code, whereby the executable code performs runtime checking to detect a buffer overrun situation or a type error situation.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 6b illustrates a flow chart of a routine for the rewriter 630 shown in FIG. 6a.

DETAILED DESCRIPTION OF THE INVENTION

Figure 1:
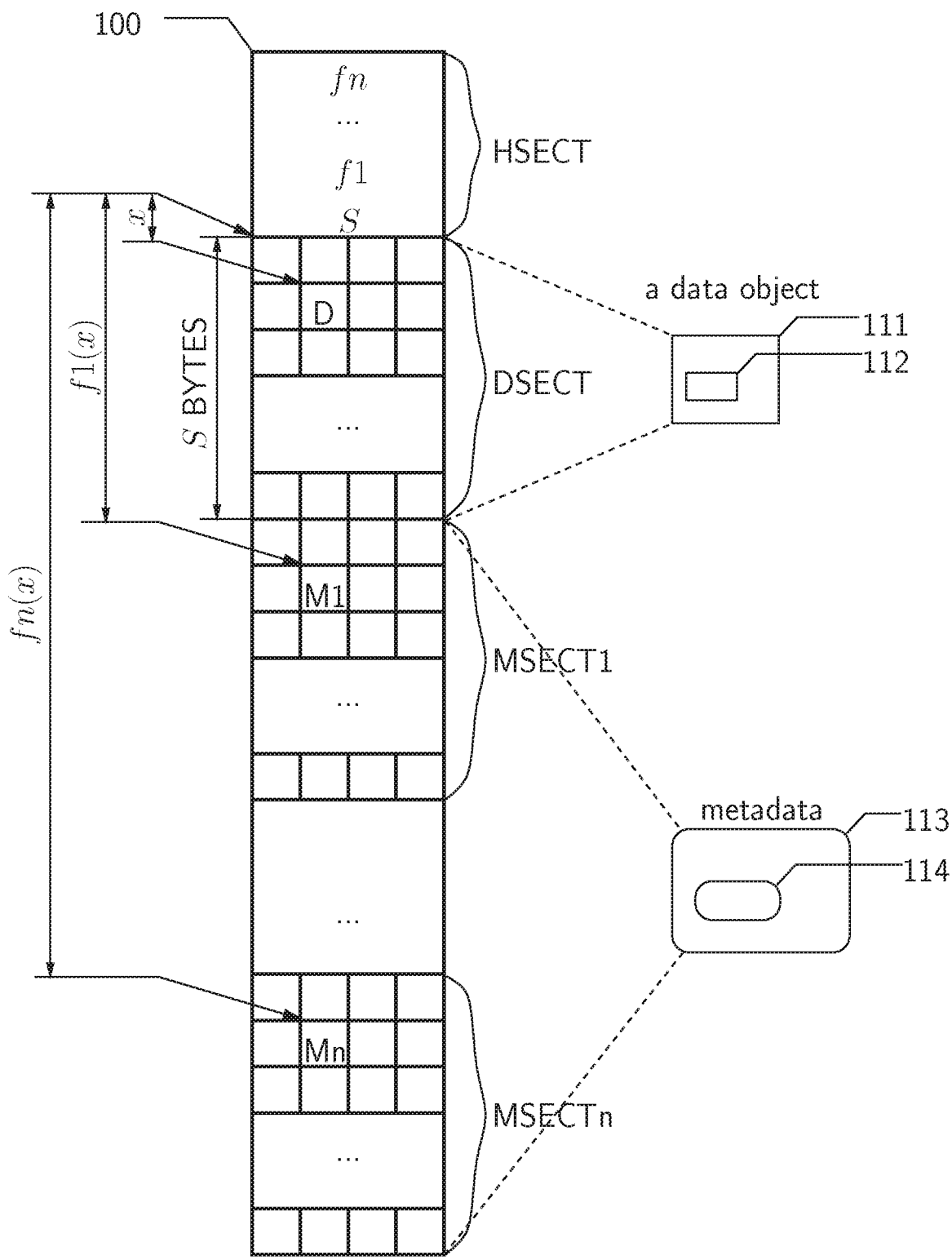
FIG. 1 illustrates the components of an example bit sequence that encodes a data object and its metadata in accordance with an example embodiment of the invention.

FIG. 1 illustrates the components of an example bit sequence that encodes a data object and its metadata in accordance with an example embodiment of the invention. Block 100 is a byte sequence that encodes a data object 111 and its metadata 113. In 100, each small square box represents 1 byte. The relative byte address increases from top to bottom, and from left to right.

Some example flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

A technique for encoding a data object 111 and its metadata 113 includes the following steps:

(1) using the native representation or any binary representation of the data object 111 as a consecutive bit sequence—Data Section (DSECT);

(2) encoding its metadata 113 into one consecutive bit sequence that comprises of multiple subsections. The first subsection is named as Metadata Section 1 (MSECT1), the second subsection is named as MSECT2, and so on. The nth subsection is named as MSECTn;

(3) adding a header—Header Section (HSECT)—that comprises of the encoding of the size S of the DSECT and the encoding of the mapping functions f1, f2, . . . , fn. Each mapping function maps the location of a bit sequence that encodes a subobject in the DSECT to the location of a bit sequence that is part of the encoding of the metadata of the subobject in a MSECT. For example, in FIG. 1, a subobject 112 is encoded into the bit sequence D at the offset x in the DSECT, a metadata 114 of the subobject is encoded by the bit sequence "M1, M2, . . . Mn." The bit subsequence M1 is located at f1(x) in MSECT1. Generally speaking, the nth bit subsequence Mn is located at fn(x) in MSECTn.

MSECTs may be placed either before HSECT or after DSECT.

The HSECT, DSECT, and MSECTs of a data object may be mapped to the consecutive memory region in the run-time environment of a program for run-time checking. Alternatively, the HSECT, DSECT, and MSECTs of a data object may be concatenated into one consecutive bit sequence as the serialized version of the data object.

In a specific implementation, a data object refers to a value of a primitive type (e.g., integer, pointer, and floating point number), a value of an aggregate data type (e.g., array, structure, and class), a value of a union type, or a collection of any data in memory or external storage.

A data object of a primitive type has one subobject that is itself. For a data object of an aggregate data type (or union type), its direct or transitive composing elements are subobjects of this aggregate (or union) data object.

Any data describing the properties of a data object can be the metadata of the data object. For example, if a data object is a pointer, the fact that this object is a pointer and the boundary information of the buffer to which this pointer points are the metadata of this pointer. If the metadata of all pointers are available in the run-time environment of a program, all buffer overruns in the program can be checked and thus prevented at run-time. As another example, the creation information of a data object is another kind of metadata. When a data object is created in a program, the information about which line of the program code creates this data object is the metadata of this data object. Besides, since data objects can come from untrusted source (such as the Internet, or outside a firewall of a network) or trusted source (such as an intranet), the source information is a kind of metadata of data objects. Generally speaking, any information about a data object can serve as the metadata of this data object.

A data object may have metadata, and each subobject of a data object may have its own metadata. The metadata of a data object comprises of the metadata of the subobjects of the data object.

Figure 2:
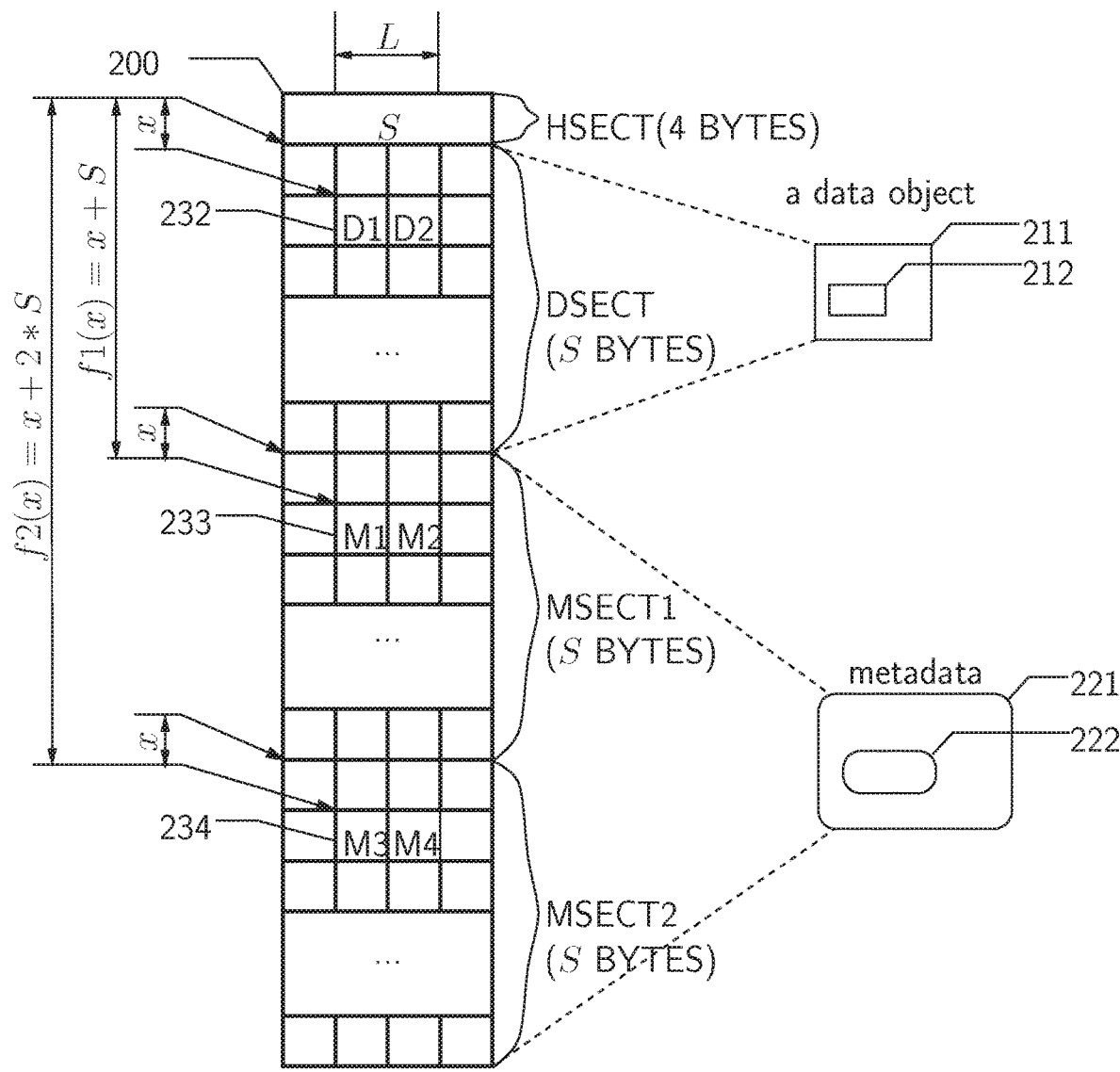
FIG. 2 illustrates an example bit sequence that encodes a data object and its metadata in accordance with an example embodiment of the invention.

FIG. 2 illustrates an example bit sequence that encodes a data object and its metadata in accordance with an example embodiment of the invention. In this bit sequence, each MSECT has the same size as its DSECT.

In FIG. 2, to encode a data object 211, we use the in-memory binary representation of 211 as a DSECT. Assume that a subobject 212 of 211 be primitive type T and be encoded as a bit sequence 232 ("D1D2") of the length L at the offset x in DSECT. The metadata (T, L, x) that describes the type of the subobject, the length, and location of 232 is implicitly encoded as follows: (1) T is encoded by a bit sequence 233 ("M1M2") of length L, and (2) 233 is placed at the offset x in MSECT1.

In 200 of FIG. 2, a bit sequence used to encode a primitive type has the same length as the bit sequence used to encode a data object of this type. For an 8-bit integer, its type is encoded in 8 bits; for a 16-bit integer, its type is encoded in 16 bits, and so on.

Table A below describes the encoding of several example primitive types.

TABLE A

| Byte position | $0^{th}$ byte | $1^{st}$ byte | $2^{nd}$ byte | $3^{rd}$ byte |
| --- | --- | --- | --- | --- |
| Bit position | 7654 3210 | 7654 3210 | 7654 3210 | 7654 3210 |
| 8-bit int (I8) | 0000 0001 | | | |
| 16-bit int (I16) | 0000 0010 | 1000 0000 | | |
| 32-bit int (I32) | 0000 0011 | 1000 0000 | 1000 0000 | 1000 0000 |
| pointer (PTR) | 0000 0111 | 1000 0000 | 1000 0000 | 1000 0000 |
| 32-bit float (R32) | 0000 1000 | 1000 0000 | 1000 0000 | 1000 0000 |
| 8-bit uninit (UI8) | 0000 0000 | | | |
| 16-bit uninit (UI16) | 0000 0000 | 0000 0000 | | |
| 32-bit uninit (UI32) | 0000 0000 | 0000 0000 | 0000 0000 | 0000 0000 |

In table A, the 8-bit int type (I8) is encoded in 8 bits; the 16-bit int type (I16) is encoded in 16 bits; the 32-bit int type (I32) is encoded in 32 bits; the pointer type (PTR) is encoded in 32 bits in 32-bit architecture or in 64 bits in 64-bit architecture; and the 32-bit float type (R32) is encoded in 32 bits. In each encoding of a type excluding UI8, UI16, and UI32, the seventh bit of the zeroth byte is zero, and the seventh bit of the rest of the bytes is 1. Therefore, it is straightforward to identify which byte in a bit sequence is the starting byte of a type encoding. Any bit patterns that allow identifying a byte in a bit sequence is the starting byte of a type encoding can be used in the type encoding.

The 8-bit uninit (i.e., 0000 0000) in table A is used as a type encoding for an 8-bit uninitialized random value in a data object. The encoding of 16-bit uninit (UI16) that is the type of 16-bit uninitialized random value is the concatenation of two UI8s. The encoding of 32-bit uninit (UI32) that is the type of 32-bit uninitialized random value is the concatenation of four UI8s.

In the example embodiment of the invention, a HSECT includes the encoding of the size S of a DSECT. The HSECT section may include other data such as where the object represented by this DSECT is defined. Each mapping function that maps the location of a bit sequence that encodes a subobject in the DSECT to the location of a bit sequence that is part of the encoding of its metadata in the MSECTs can be derived from S.

Assume that a bit sequence that encodes a subobject be located at the offset x in the DSECT. The function fn(x) that maps the location of the bit sequence in the DSECT to the location of a bit sequence that encodes part of the metadata of the subobject in the nth MSECT is fn(x)=x+n*S.

Figure 3:
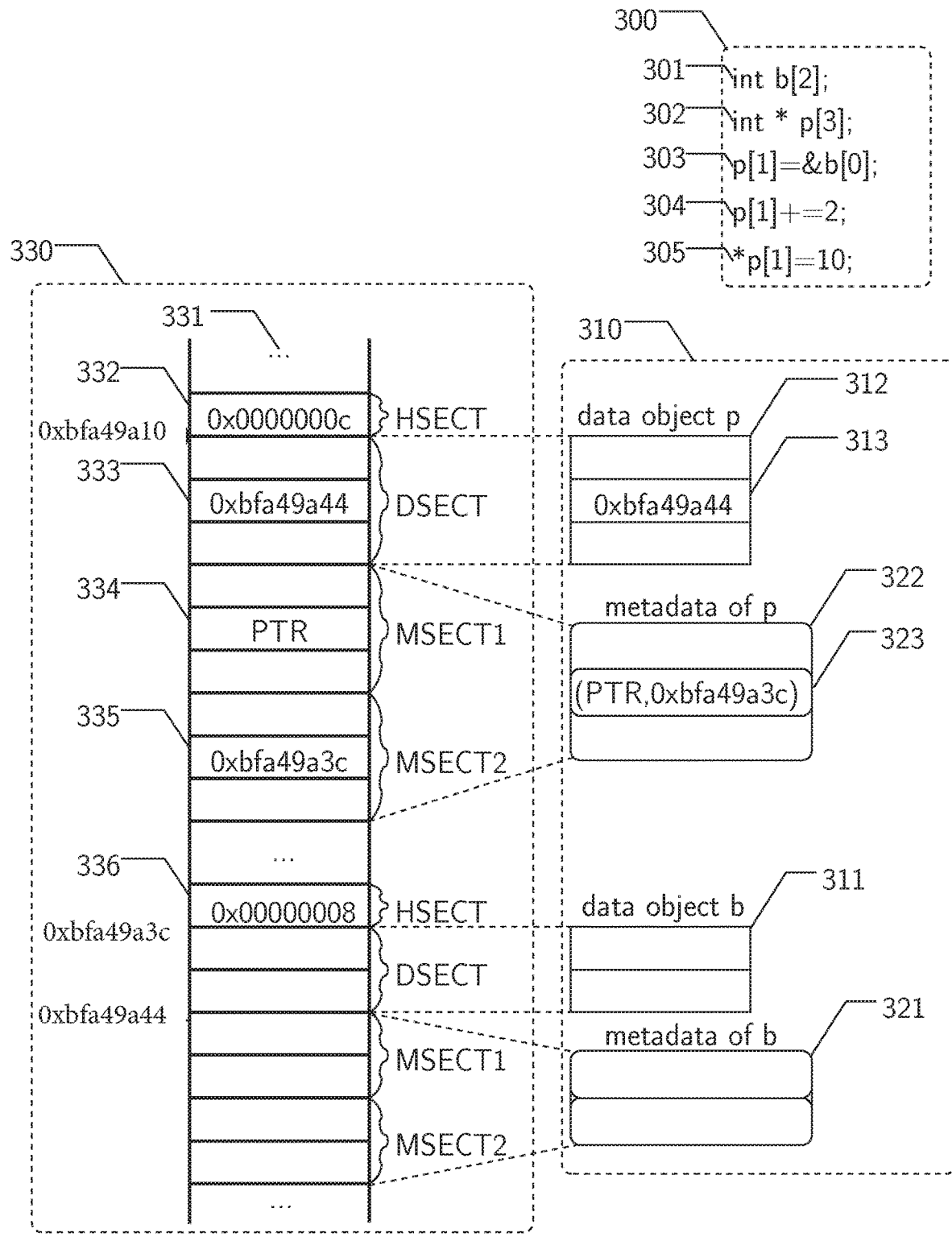
FIG. 3 illustrates an example program with buffer overrun vulnerability, the logic view of the data objects of the program and their metadata in an execution of the program, and its run-time environment of the execution. The run-time environment encodes the data objects and their metadata in accordance with an example embodiment of the invention.

FIG. 3 illustrates an example program with buffer overrun vulnerability. FIG. 3 shows the logic view of the data objects of the program and their metadata in an execution of the program, and its run-time environment of the execution. The run-time environment encodes the data objects and their metadata in accordance with an example embodiment of the invention.

In FIG. 3, box 300 contains an example program and a statement 305 causes a buffer overrun. Box 310 contains a logic view of the data objects and their metadata in an execution of the program. Box 330 contains a run-time environment of the execution. The run-time environment comprises of a memory 331 in which each rectangle represents 4-byte, and the relative byte address increases from top to bottom.

A statement 301 in 300 declares an array data object 311 ("b"). Object 311 is encoded in the memory of size 8-byte at the address 0xbfa49a3c, and its size is encoded in 336. Likewise, the statement 302 in 300 declares another array data object 312 ("p"). Object 312 is encoded in the memory of size 12-byte at the address 0xbfa49a10, and its size is encoded in 332.

The subobject 313 ("p[1]") of 312 ("p") is encoded in 333, its metadata 323 including the type PTR, and the base address of the buffer pointed by 313 are encoded in 334 and 335, respectively.

We denote the content of 334 as "type(p[1])", the content of 335 as "bufBase(p[1])." Table B lists the example instructions to store and load "type(p[1])" and "bufBase(p[1])" from the run-time environment 330 in FIG. 3. In one example embodiment, the instruction "store (addr, s, v)" stores a value "v" of size "s" in the memory address "addr" and the instruction "load(addr, s)" loads a value of size "s" from the memory address "addr."

TABLE B

| | | |
|---|---|---|
| Store metadata | Store type(p[1]) | store(&p[1]+sizeof(p),4,type(p[1])) |
| | Store bufBase(p[1]) | store(&p[1]+2*sizeof(p),4,bufBase(p[1])) |
| Load metadata | Load type(p[1]) | type(p[1])=load(&p[1]+sizeof(p),4) |
| | Load bufBase(p[1]) | bufBase(p[1])=load(&p[1]+2*sizeof(p),4) |

In table B, "store(&p[1]+sizeof(p), 4, type(p[ ]))" stores the type of "p[1]" into 334. "store(&p[1]+2*sizeof(p), 4, bufBase(p[1]))" stores the base address of the buffer that is pointed by "p[1]" into 335. "load(&p[1]+sizeof(p),4)" loads the type of "p[1]" from 334. "load(&p[1]+2*sizeof(p),4)" loads the base address of the buffer that is pointed by "p[1]" from 335.

In an embodiment of the invention, the "Store metadata" instructions in table B are inserted after 303 in FIG. 3 to store the metadata of the subobject "p[1]." The "Load metadata" instructions in table B, along with other three instructions: the instruction "bufSize=load (bufBase(p[1])-4, 4)" to load the size of the buffer pointed by "p[1]," three run-time checks "assert(type(p[1])==PTR)", "assert(bufBase(p[1])<=p[1])", and "assert(p[1]+4<=bufBase(p[1])+bufSize(p[1]))" are inserted before the code 305 to prevent the buffer overrun.

Figure 4:
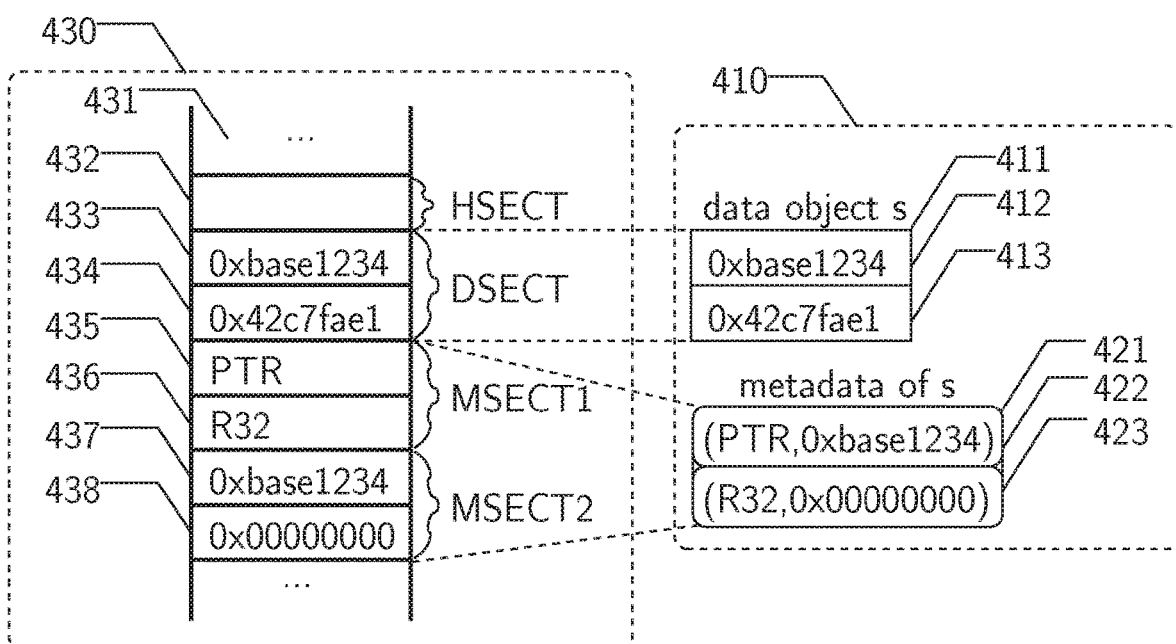
FIG. 4 illustrates an example program with a type error, the logic view of the data objects of the program and their metadata in an execution of the program, and its run-time environment of the execution. The run-time environment encodes the data objects and their metadata in accordance with an example embodiment of the invention.

The types stored in the first MSECT is of importance for checking errors other than buffer overruns. FIG. 4 illustrates an example program with a type error, the logic view of the data objects of the program and their metadata in an execution of the program, and its run-time environment of the execution. The run-time environment encodes the data objects and their metadata in accordance with an example embodiment of the invention.

In FIG. 4, box 400 contains an example program with a type error in a statement 405. Box 410 contains a logic view of the data objects of 400 in an execution. Box 430 contains a run-time environment of the execution. Box 430 includes a memory 431 in which each rectangle box represents 4-byte, and the relative byte address of the memory increases from top to bottom.

Structure 401 declares a data object 411 ("s"). The data object 411 ("s") is encoded in the memory 433 and 434. Its subobject 412 ("s.p") is encoded in 433 and its subobject 413 ("s.f") is encoded in 434. The statement 403 assigns a floating pointer number 99.9 to "s.f." Thus, "s.f" gets the binary representation of 99.9. In the run-time environment, the binary representation of 99.9 is encoded in 434. The metadata of "s.f" is 423, and it is encoded in 436 and 438.

In the statement 404, the address of "s.f" is taken and casted to "ip." In statement 405, "ip" is dereferenced as an integer and increased by 2. In this case, the binary representation stored in 434 is interpreted as an integer. This is an undefined behavior in the C language. But the C language itself cannot detect this error. Given the type information stored in 436, we can check whether the type of the memory pointed by "ip" is consistent with the intended type loaded through the dereference of "ip" at run-time. The type stored in 436 is R32 and it is loaded as I32, thus the run-time checking fails and the type mismatch error is detected.

With more sophisticated encoding of PTR and an extra global data structure, we can check errors such as double free and dereference of dangling pointers.

It is not uncommon that metadata requires more storage than data does. The more information metadata contains, the more storage it uses. The metadata of a data object is first encoded in one consecutive bit sequence. We may split the consecutive bit sequence to multiple subsections, and store each subsections into one MSECT.

Figure 5:
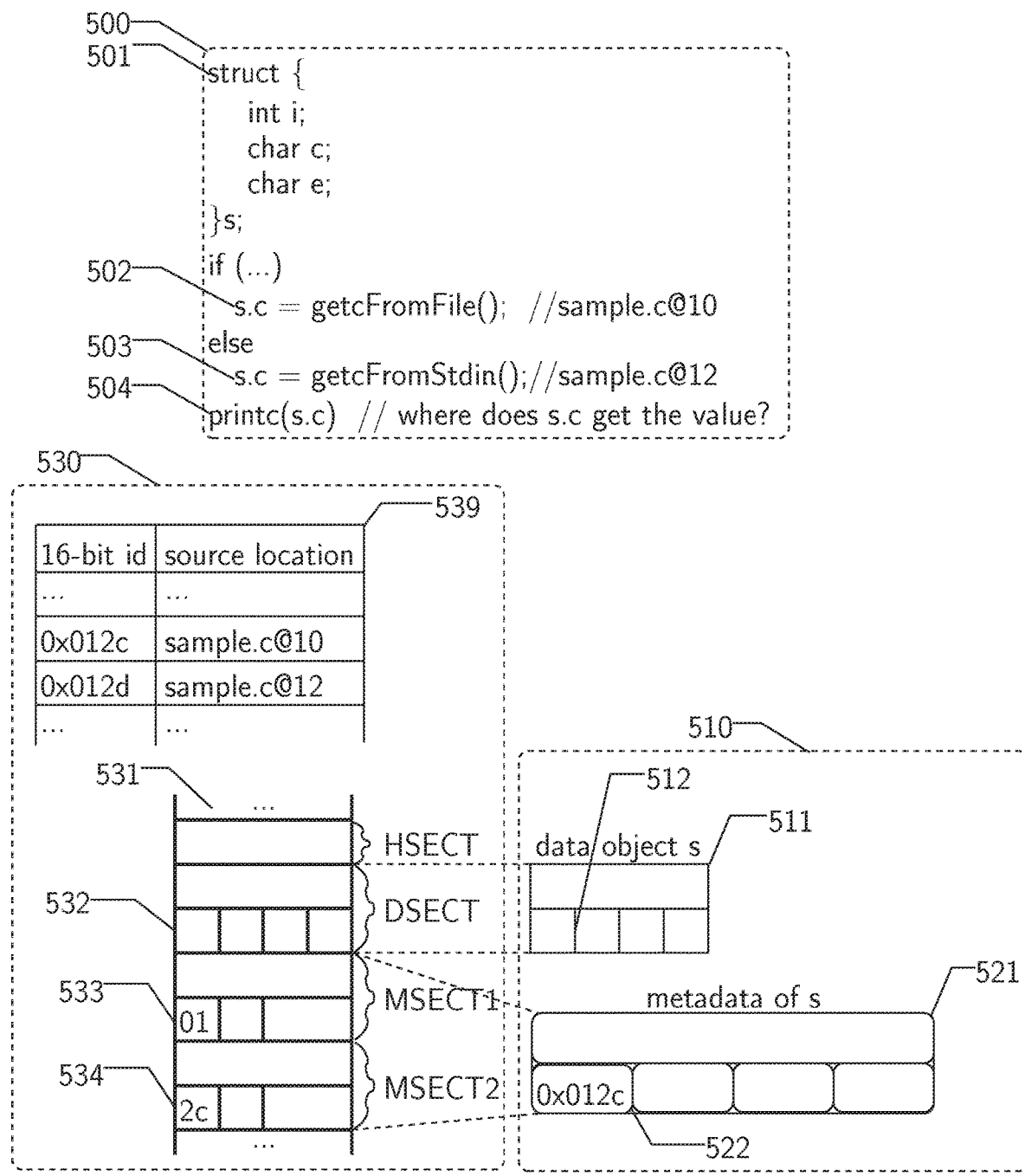
FIG. 5 illustrates an example program using source location as metadata, the logic view of the data objects of the program and their metadata in an execution of the program, and its run-time environment of the execution. The run-time environment encodes the data objects and their metadata in accordance with an example embodiment of the invention. Metadata is split and encoded in two MSECTs.

FIG. 5 illustrates an example program using source location as metadata, the logic view of the data objects of the program and their metadata in an execution of the program, and its run-time environment of the execution. The run-time environment encodes the data objects and their metadata in accordance with an example embodiment of the invention. Metadata is split and encoded in two MSECTs.

In FIG. 5, box 500 contains a program and the statement 501 declares a data object 511 ("s"). The subobject "s.c" can be assigned by two statements 502 or 503. Box 510 contains the logic view of the data object and its metadata of program 500 in an execution. In 510, 511 is the data object "s," 512 is the subobject "s.c." The metadata of the object "s" is 521, and the metadata of the subobject "s.c" is 0x012c (522).

Box 530 shows a run-time environment of 500 in an execution. Box 530 includes a map 539 and a memory 531. In 539, each source location maps to a unique 16-bit value. In 531, each rectangle box represents 4-byte, each small square box represents 1-byte, and the relative byte address increases from top to bottom and from left to right. The object 511 is encoded as DSECT and the subobject 512 is encoded as 1 byte in 532, and the metadata 522 is split as 0x01 and 0x2c. 0x01 is encoded in 533 and 0x2c is encoded in 534. By checking the metadata of "s.c," we know "s.c" is assigned by the statement 502 in this execution.

In one example embodiment, a technique preserves the original representation of data objects. The storage used for metadata is allocated along with the storage used for a data object because a data object and its metadata can be mapped to one consecutive memory region. It does not inject non-deterministic code (such as dynamic memory allocation) into original programs, and thus it preserves the deterministic properties of original programs. It may be used for all platforms on which compiled C, C++, and assembly language programs execute.

Figure 6A:
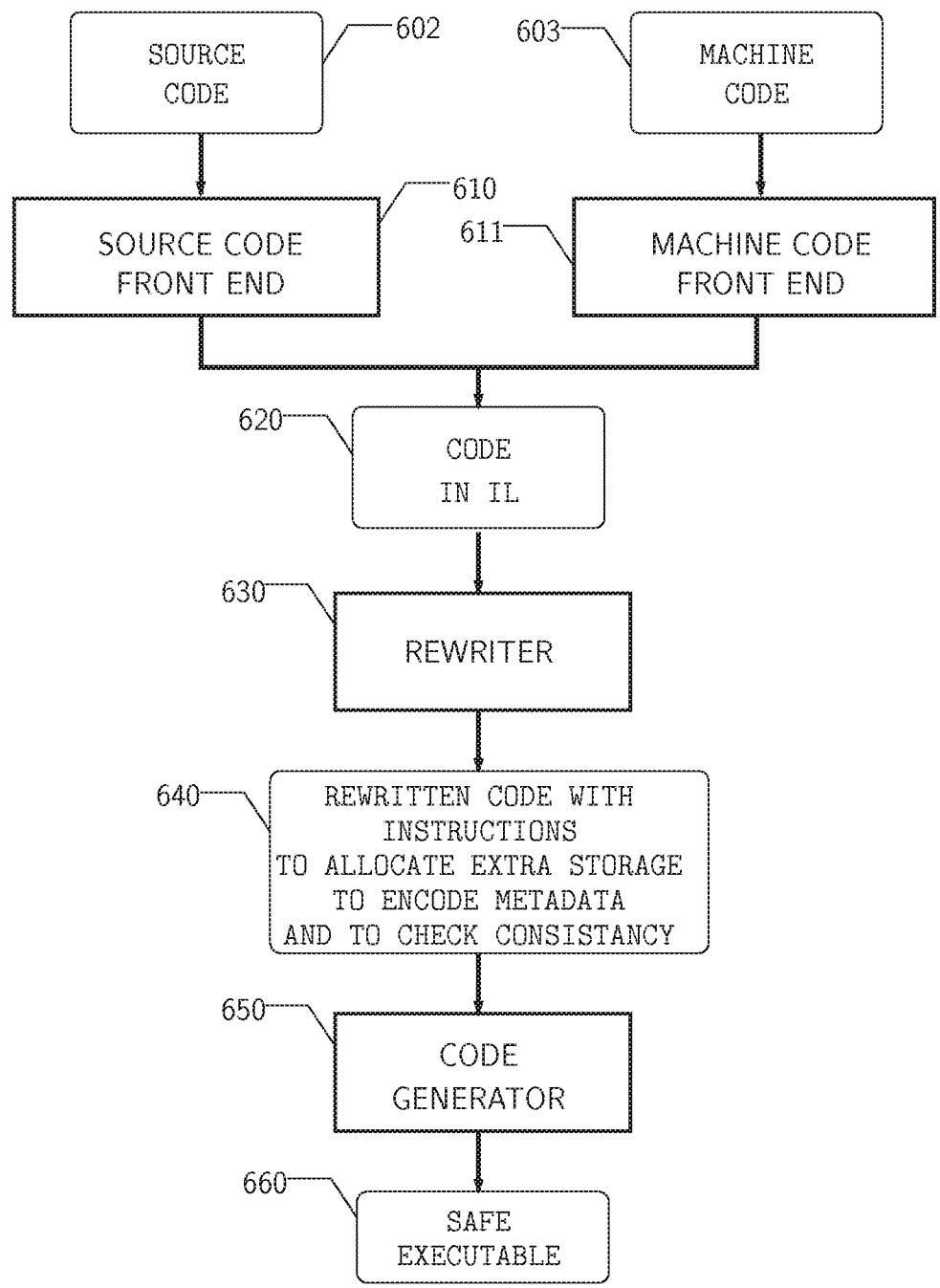
FIG. 6a illustrates a schematic diagram of a method and system for rewriting a program to encode data objects and their metadata in the run-time environment of the program and to add run-time checks to the program.

FIG. 6a illustrates a schematic diagram of a method and system for rewriting a program to encode data objects and their metadata in the run-time environment of the program and to add run-time checks to the program by: (1) rewriting the data object allocation constructs to augment each data object with a HSECT and multiple MSECTs, (2) adding extra instructions to store HSECTs and MSECTs with the metadata of data objects, (3) adding extra instructions to load metadata from HSECTs and MSECTs, and (4) adding extra instructions to check whether the use of each data object is consistent with its metadata or not. In general, the rewriting can be done at compile time, or at run-time before a program is executed.

In FIG. 6a, the rectangles with round corners denote a program code in different representations, while the rectangles represent the major components of the method. The method describes how to translate a program source code 602 or an executable machine code 603 to a program 640 that allocates extra storage for HSECTs and MSECTs, encodes mapping functions and metadata in HSECTs and MSECTs, respectively, and checks whether the use of a bit sequence is consistent with the metadata of the bit sequence or not.

A source code front-end 610 takes source code 602 as input and generates the code 620 in an intermediate language (IL). The intermediate language could be the same as the source language, a subset of the source language, or any intermediate representation. Alternatively, a machine code front-end and IL reconstructor 611 takes machine code 603 as input and generates the code 620 in IL.

The code 620 is then passed to the rewriter 630 that rewrites the data object allocation constructs to augment each data object with a HSECT and multiple MSECTs, inserts extra instructions to encode mapping functions and metadata in HSECTs and MSECTs respectively, and insert extra instructions to check whether the use of each program data is consistent with its metadata. The output 640 of 630 is passed to the code generator 650 to generate an executable program 660.

Figure 6B:
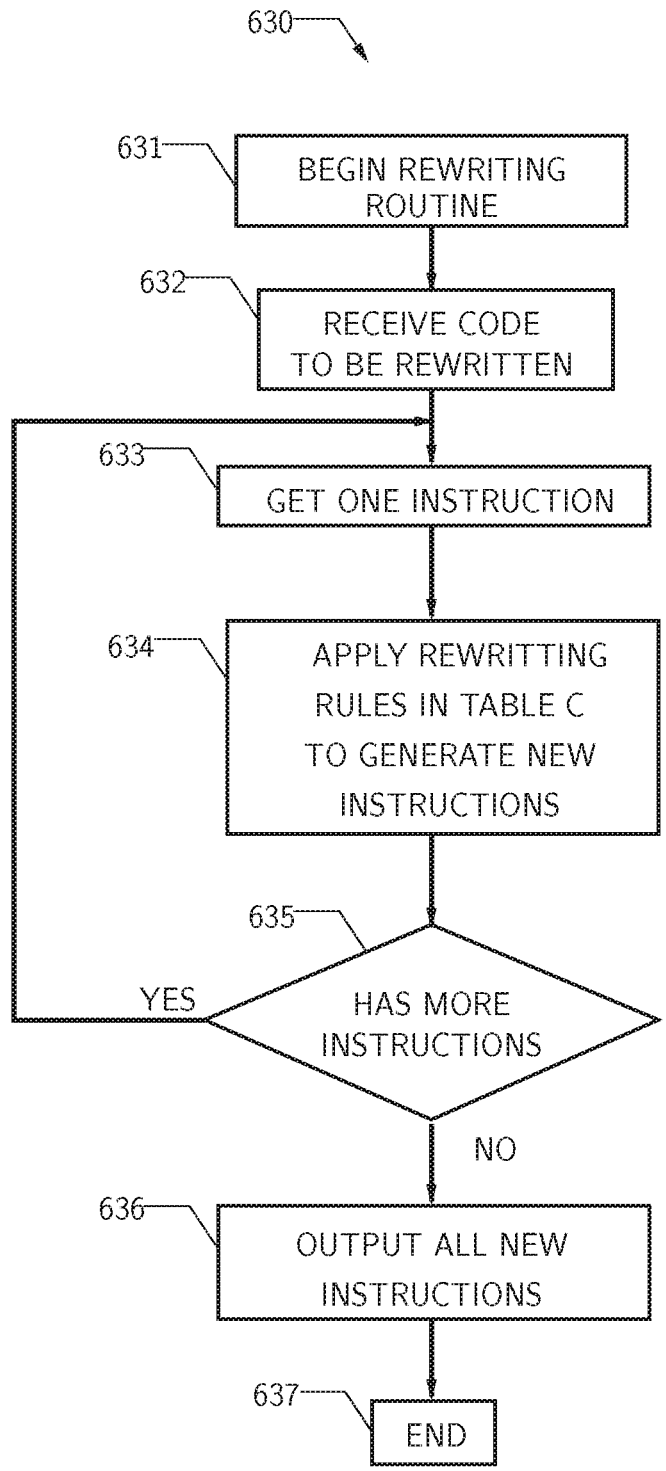

FIG. 6b illustrates a flow chart of a routine for the rewriter 630 shown in FIG. 6a. The routine begins at the block 631 and proceeds to the block 632 where the program code to be rewritten is received. The block 633 gets an instruction and passes it to the block 634 that applies the rewriting rules shown in table C and generates new instructions. If there are more instructions (635), the execution resumes at block 633. Otherwise, the execution proceeds to the block 636 that outputs all new instructions. The routine ends at a block 637.

In one example embodiment, the code 620 is rewritten based on the syntax directed rewriting rules in table C. The rules specify that an instruction of the form in column C620 be replaced with a set of instructions in column C640 in table C. In the rewriting rules, we use the following naming conventions: "v1," "v2," . . . , "vn" denote the virtual registers for data values; "k1," "k2," . . . , "kn" denote the virtual registers for type metadata; "b1," "b2," . . . , "bn" denote the virtual registers for buffer base address metadata; and "s1," "s2," . . . , "sn" denote the virtual registers for buffer size metadata. The rules are briefly discussed as follows:

(r1) A variable declaration instruction of the form "T x." The memory bound to the variable "x" is preserved as a DSECT. The rewriter 630 preappends 4-byte memory before the DSECT as the storage for a HSECT, and appends 2*sizeof(DSECT) byte memory after the DSECT as the storage for two MSECTs. It initializes the HSECT with the size of the DSECT. It also initializes every byte in the first MSECT as UI8 to indicate that every byte in the DSECT contains an uninitialized random 8-bit value. In one embodiment of the present invention, this rewriting is achieved by replacing the instruction in row r1 in column C620 with the instructions in rows r11, r12, r13, and r14 in column C640 in table C, and all uses of "x" are replaced by "x.dsect".

(r2) A dynamic memory allocation instruction of the form "v-=malloc(v2)." The memory returned by the dynamically allocation is preserved as a DSECT. The rewriter 630 preappends 4-byte memory before the DSECT as the storage for a HSECT, and appends 2*sizeof(DSECT) byte memory after the DSECT as the storage for two MSECTs. It then initializes the HSECT with the size of the DSECT. It also initializes every byte in the first MSECT as UI8 to indicate that every byte in the DSECT contains an uninitialized random 8-bit value. In one embodiment of the present invention, this rewriting is achieved by replacing the instruction in the row r2 in column C620 with the code in rows r21, r22, r23, r24, and r25 in column C640 in table C.

(r3) A load instruction of the form "v1=load(v2, s)." It loads s-byte data from the memory address "v2" to "v1." The rewriter 630 adds extra instruction to (1) check whether "v2" is a pointer, and whether the pointer is out-of-bound, and (2) load the metadata of the s-byte data. In one embodiment of the present invention, this rewriting is achieved by replacing the instruction in the row r3 in column C620 with the instructions in rows r31, r32, r33, r34, r35, r36, and r37 in column C640 in table C.

(r4) A store instruction of the form "store(v1, s, v2)." It stores v2 as s-byte data into the memory address "v1." The rewriter 630 adds extra instruction to (1) check whether "v1" is a pointer and whether the pointer is out-of-bound, and (2) store the metadata of "v2" into MSECTs. In one embodiment of the present invention, this rewriting is achieved by replacing the instruction in the row r4 in column C620 with the instructions in rows r41, r42, r43, r44, r45, and r46 in column C640 in table C.

(r5) An address taken instruction of the form "v1=addrof (x)." It takes the address of the memory bound to "x" and saves the value into a register "v1." The rewriter 630 adds extra instructions to compute the metadata of the value. The metadata comprises of the type PTR (e.g., pointer) of the value, the base address of the memory bound to "x," and the size of the memory bound to "x." In one embodiment of the present invention, this rewriting is achieved by replacing the instruction in the row r5 in column C620 with the instructions in rows r51, r52, r53, and r54 in column C640 in table C.

(r6) A constant integer value instruction of the form "v1=n." It assigns an integer constant "n" to a register "v1." The rewriter 630 adds extra instructions to compute the metadata of the constant value. The metadata comprises of the type 132 of the constant value, the base address that is designated as 0, and the size that is designated as 0. In one embodiment of the present invention, this rewriting is achieved by replacing the instruction in the row r6 in column C620 with the instructions in rows r61, r62, r63, and r64 in column C640 in table C.

(r7) A constant float value instruction of the form "v1=f." It assigns a floating point constant "f" to a register "v1." The rewriter 630 adds extra instructions to compute the metadata of the floating-point constant value. The metadata comprises of the type R32 of the floating-point constant value, the base address that is designated as 0, and the size that is designated as 0.

In one embodiment of the present invention, this rewriting is achieved by replacing the instruction in the row r7 in column C620 with the instructions in rows r71, r72, r73, and r74 in column C640 in table C.

(r8) An arithmetic instruction of the form "v1-v2 op v3" where "op" denotes the arithmetic operation + (addition), − (subtraction), * (multiplication), or / (division). The rewriter 630 adds extra instructions to compute the metadata of "v1." The metadata comprises of the type "KindOp(k2,k3)," the base address "b2+b3," and the size "s2+s3." In one embodiment of the present invention, this rewriting is achieved by replacing the instruction in row r8 in column C620 with the instructions in rows r81, r82, r83, and r84 in column C640 in table C. An example definition of "k1=KindOp(k2,k3)" is shown in table D.

TABLE C

| | C620 | | C640 |
|---|---|---|---|
| r1 | T x; | r11 | struct { |
| | | | unsigned int hsect; |
| | | | T dsect; T msect[2];; |
| | | | } x; |
| | | r12 | v1=addrof(x.dsect); |
| | | r13 | store(v1−4,4,sizeof(x.dsect)) |
| | | r14 | for(i=0;i<sizeof(x.dsect);++i) |
| | | | store(v1+i+sizeof(x.dsect),1,UI8) |
| r2 | v1=malloc(v2) | r21 | v0=malloc(4+3*v2); |
| | | r22 | store(v0,4,v2); |
| | | r23 | v1=v0+4; |
| | | r24 | for(int i = 0; i < v2; ++i) |
| | | | store (v1+i+v2, 1, UI8) |
| | | r25 | k1 = PTR; b1 = v1; s1 = v2; |
| r3 | v1=load(v2, s) | r31 | assert(k2==PTR); |
| | | r32 | assert(b2<=v2); |
| | | r33 | assert(v2+s<=s2); |

TABLE C-continued

| | C620 | | C640 |
|---|---|---|---|
| | | r34 | v1=load(v2,s); |
| | | r35 | k1=load(v2+s2, s); |
| | | r36 | b1=load(v2+2*s2,s); |
| | | r37 | s1=load(b1-4,4); |
| T4 | store(v1,s,v2) | r41 | assert(k1==PTR); |
| | | r42 | assert(b1<= v1); |
| | | r43 | assert(v1+s<=b1+s1); |
| | | r44 | store(v1,s,v2) |
| | | r45 | store(v1+s1,s, k2) |
| | | r46 | store(v1+2*s1,s, b2) |
| r5 | v1=addrof(x) | r51 | v1=addrof(x.dsect); |
| | | r52 | k1=PTR; |
| | | r53 | b1=addrof(x.dsect); |
| | | r54 | s1=load(b1-4,4) |
| r6 | v1=n | r61 | v1=n; |
| | | r62 | k1=I32; |
| | | r63 | b1=0; |
| | | r64 | s1=0; |
| r7 | v1=f | r71 | v1=f; |
| | | r72 | k1=R32; |
| | | r73 | b1=0; |
| | | r74 | s1=0; |
| r8 | v1=v2 op v3 | r81 | v1=v2 op v3; |
| | | r82 | k1=KindOp(k2, k3) |
| | | r83 | b1=b2+b3; |
| | | r84 | s1=s2+s3; |

TABLE D

| k1=KindOp(k2, k3) | if k2==PTR && k3==I32 then k1=PTR<br>else if k2==I32 && k3==PTR then k1=PTR<br>else if k2==I32 && k3==I32 then k1=I32<br>else if k2==I8 && k3==I8 then k1=I8<br>else if k2==I16 && k3==I16 then k1=I16<br>else if k2==R32 && k3==R32 then k1=R32<br>else if k2==UI8 \|\| k3==UI8 then k1=UI8<br>else if k2==UI16 \|\| k3==UI16 then k1=UI16<br>else k1=UI32 |
|---|---|

Other run-time checking may be implemented by plugging in different rewriting rules in block 634 in FIG. 6b.

U.S. provisional patent application 61/256,148 includes an Ocaml and C source code version of FIG. 6a (including rewrite 630). This provisional patent application is incorporated by reference. Another version of rewriter 630 is implemented in C++ source code in the appendix of this application.

In table E, column E602 lists the source code of an example C program P0. P0 has a buffer overrun vulnerability. The buffer overrun is caused by the code at line 5. We use P0 to demonstrate how the method in FIG. 6 rewrites P0 to encode metadata at the run-time environment of P0 and to check the buffer overflow. In FIG. 6, 610 simplifies the code in E602 as the code in column E620; flow 630 rewrites the code in column E620 to the code listed in column E640.

TABLE E

| E602 | | E620 | | E640 |
|---|---|---|---|---|
| 1 int q; | 1a | int q; | 1a1 | struct {<br>unsigned int hsect;<br>int dsect; int msect[2];<br>} q; |
| | | | 1a2 | v1=addrof(q.dsect); |
| | | | 1a3 | store(v1-4, 4, sizeof(q.dsect)) |
| | | | 1a4 | for(i=0;i<sizeof(p.dsect);++i)<br>store(v1+i+sizeof(q.dsect), 1, UI8) |
| 2 int *p; | 2a | int * p | 2a1 | struct {<br>unsigned int hsect; |

TABLE E-continued

| E602 | | E620 | | E640 |
|---|---|---|---|---|
| | | | | int * dsect; int * msect[2];<br>} p; |
| | | | 2a2 | v1=addrof(p.dsect); |
| | | | 2a3 | store(v1-4, 4, sizeof(p.dsect)) |
| | | | 2a4 | for(i=0;i<sizeof(p.dsect);++i)<br>store(v1+i+sizeof(p.dsect), 1, UI8) |
| 3 p=&q; | 3a | v0=addrof(q) | 3a1 | v0=addrof(q.dsect); |
| | | | 3a2 | k0=PTR;b0= addrof(q.dsect);<br>s0=load(b0-4,4); |
| | 3b | v1=addrof(p) | 3b1 | v1=addrof(p.dsect); |
| | | | 3b2 | k1=PTR;b1=addrof(p.dsect);<br>s1=load (b1-4,4) |
| | 3c | store(v1, sizeof(&q),v0) | 3c1 | assert(k1==PTR);<br>assert(b1<=v1);<br>assert(v1+sizeof(&q)<=b1+s1); |
| | | | 3c2 | store(v1,sizeof(&q.dsect), v0); |
| | | | 3c3 | store(v1+s1,sizeof(&q.dsect), k0); |
| | | | 3c4 | store(v1+2*s1,sizeof(&q.dsect),b0); |
| 4 p=p+1; | 4a | v1=addrof(p) | 4a1 | v1=addrof(p.dsect); |
| | | | 4a2 | k1=PTR;<br>b1=addrof(p.dsect);<br>s1=load(b1-4,4); |
| | 4b | v2=load(v1, sizeof(p)) | 4b1 | assert(k1==PTR);<br>assert(b1<=v1);<br>assert(v1+sizeof(p.dsect)<=b1+s1); |
| | | | 4b2 | v2=load(v1,sizeof(p.dsect)); |
| | | | 4b3 | k2=load(v1+s1,sizeof(p.dsect)); |
| | | | 4b4 | b2=load(v1+2*s1,sizeof(p.dsect)); |
| | | | 4b5 | s2=load(b2-4,4); |
| | 4c | v3=1*sizeof(int) | 4c1 | v3=1*sizeof(int) |
| | | | 4c2 | k3=I32; b3=0; s3=0; |
| | 4d | v2=v2+v3 | 4d1 | v2=v2+v3 |
| | | | 4d2 | k2=KindOp(k2, k3);<br>b2=b2+b3;<br>s2=s2+s3; |
| | 4e | store(v1, sizeof(p),v2) | 4e1 | assert(k1==PTR);<br>assert(b1<=v1);<br>assert(v1+sizeof(p.dsect)<=bl+s1); |
| | | | 4e2 | store(v1,sizeof(p.dsect),v2); |
| | | | 4e3 | store(v1+s1,sizeof(p.dsect),k2); |
| | | | 4e4 | store(v1+2*s1,sizeof(p.dsect),b2) |
| 5 *p=0; | 5a | v1=addrof(p) | 5a1 | v1=addrof(p.dsect); |
| | | | 5a2 | k1=PTR;b1=addrof (p.dsect);<br>s1=load(b1-4,4); |
| | 5b | v2=load(v1, sizeof(p)) | 5b1 | assert(k1==PTR);<br>assert(b1<=v1);<br>assert(v+sizeof(p.dsect)<=b1+s1); |
| | | | 5b2 | v2=load(v1,sizeof(p.dsect)); |
| | | | 5b3 | k2=load (v1+s1,sizeof(p.dsect)); |
| | | | 5b4 | b2=load(v1+2*s1,sizeof(p.dsect)); |
| | | | 5b5 | s2=load(b2-4,4) |
| | 5c | v3=10 | 5c1 | v3=10 |
| | | | 5c2 | k3=I32;b3=0;s3=0; |
| | 5d | store(v2, sizeof(*p),v3) | 5d1 | assert(k2==PTR);<br>assert(b2<=v2);<br>assert(v2+sizeof(*p)<=b2+s2) |
| | | | 5d2 | store(v2,sizeof(*p.dsect),v3); |
| | | | 5d3 | store(v2+s2,sizeof(*p.dsect), k3); |
| | | | 5d4 | store(v2+2*s2,sizeof(*p.dsect), b3) |

The instructions in column E602 are first simplified as the corresponding instructions in column E620, and then rewritten as the instructions in column E640. For example, the source code at line 1 in column E602 is first simplified as the instruction labeled 1a in column E620, which is then rewritten as the instructions labeled 1a1, 1a2, 1a3, and 1a4 in column E630 in accordance to the rule r1 in table C.

Flow 630 adds extra storage "q.hsect," "q.msect[0]," and "q.msect[1]" by rewriting 1a as 1a1 in column E640. The bit sequence originally stored in "q" is now stored in "q.dsect"—location 702 in FIG. 7.

Flow 630 adds extra storage "p.hsect," "p.msect[0]," and "p.msect[1]" by rewriting 2a as 2a1 in column E640. The bit sequence originally stored in "p" is now stored in "p.dsect"—location 707 in FIG. 7.

Flow 630 adds extra instructions 1a2, 1a3, and 1a4 in column E640 to populate "q.hsect" and "q.msect[0]" with the metadata data of "q.dsect" that are the size of "q.dsect" and the uninitialized type UI8 for each byte of random value stored in "q.dsect."

Flow 630 adds extra instructions 2a2, 2a3, and 2a4 in column E640 to populate "p.hsect" and "p.msect[0]" with the metadata data of "p.dsect" that are the size of "p.dsect" and the uninitialized type UI8 for each byte of random value stored in "p.dsect."

The source code at line 3 in column E602 is first simplified as the instructions 3a, 3b, and 3c in column E620. Instruction 3a computes the address of "q." According to the rule r5 in table C, it is translated as instruction 3a1 that computes the address of "q.dsect" because the bit sequence originally stored in "q" is now stored in "q.dsect." The address of "q.dest" is stored in the virtual register "v0." Extra instructions 3a2 in column E640 are added to compute the metadata of "v0." The metadata include: the type of "v0" that is stored in "k0," the base address of the buffer pointed by "v0" that is stored in "b0," the size of the buffer pointed by "v0" that is stored in "s0."

Similarly, instruction 3b is rewritten as 3b1 and 3b2.

Instruction 3c stores "v0" to the address "v1." According to the rule r4 in table C, it is translated to 3c1, 3c2, 3c3, and 3c4 in column E640. Instructions 3c1 check whether the store causes a buffer overrun or not. While "v0" is stored into "p.dsect" by instruction 3c2, its metadata "k0" and "b0" are stored into "p.msect[O]" and "p.msect[1]" by instructions 3c3 and 3c4 respectively.

In this program, the run-time checking in 3c1 is redundant, since it will always succeed. Such redundant instructions may be eliminated by the technology used in compiler optimization.

The source code at line 4 in column E602 is first simplified as the instructions 4a, 4b, 4c, 4d, and 4e in column E620. Instruction 4a is rewritten as the instruction 3a in the same way.

Instruction 4b loads a bit sequence of size "sizeof(p)" from the address 'v1" to the virtual register "v2." It is rewritten as 4b1, 4b2, 4b3, 4b4, and 4b5 according to the rule r3 in table C.

Instructions 4b1 check whether the load causes a buffer overrun or not. While "v2" is loaded by 4b2, the metadata of "v2," including the type of "v2," the base address of the buffer pointed by "v2," and the size of the buffer pointed by "v2" are loaded by 4b3, 4b4, and 4b5 respectively.

Instruction 4c in column E620 computes a value "v3." It is rewritten as 4c1 and 4c2 according to the rule r6 in table C because 1*sizeof(int) is a constant. Extra instructions 4c2 compute the metadata of the constant. The type of the constant is I32 which is stored in the virtual register "k3," the base address "b3" and the size "s3" of the buffer pointed by "v3" are zero since "v3" is not a pointer.

Instruction 4d in column E620 adds "v3" to "v2." It is rewritten as 4d1 and 4d2 according to rule r8 in table C. Extra instructions 4d2 compute the metadata of "v2." The type of the result "v2" is computed by "KindOp(k2, k3)" that returns a PTR type since "k2" is PTR and "k3" is I32. An example definition of KindOp is shown in table D. Since "b3" and "s3" are zero, "b2" and "s2" will remain the same values.

Instruction 4e in column E620 stores "v2" to the address "v1." It is rewritten the same way as 3c.

Figure 7:
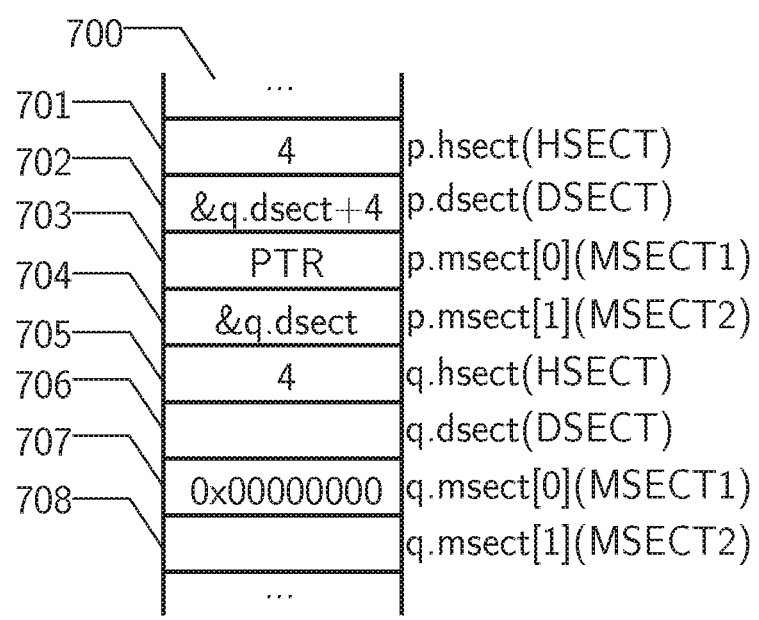
FIG. 7 illustrates the snapshot of the run-time environment after the code 4e4 in column E640 in table E is executed.

FIG. 7 illustrates the snapshot of the run-time environment after the code 4e4 in column E640 in table E is executed.

The translation of source code at line 5 in column E602 of table E facilitates run-time checking. Specifically, the rewritten instructions in column E640 of table E load metadata from the run-time environment and use the metadata to detect the buffer overrun. The source code is first simplified to the instructions 5a, 5b, 5c, and 5d in column E620 of table E.

Instruction 5b is rewritten to load the value stored at "p.dsect" as well as the metadata of the value-a type, a base address, and a size that are loaded by 5b3, 5b4, and 5b5, respectively; and instruction 5d is rewritten with the run-time checks in 5d1 to check whether "v2" is a pointer and whether it is within the boundary of the buffer that is supposed to be pointed by "v2." The latter check will fail at run-time because "v2" points to 707 that is not part of the memory bound to "q.dsect" in FIG. 7.

The types stored in the first MSECT may also be used to decode the bit patterns stored in a DSECT by utilizing the special property of our type encoding, that is, each type encoding has a unique bit pattern in its first byte. As a result, simply scanning the MSECT can identify which the offset in the MSECT represents which type.

Figure 8:
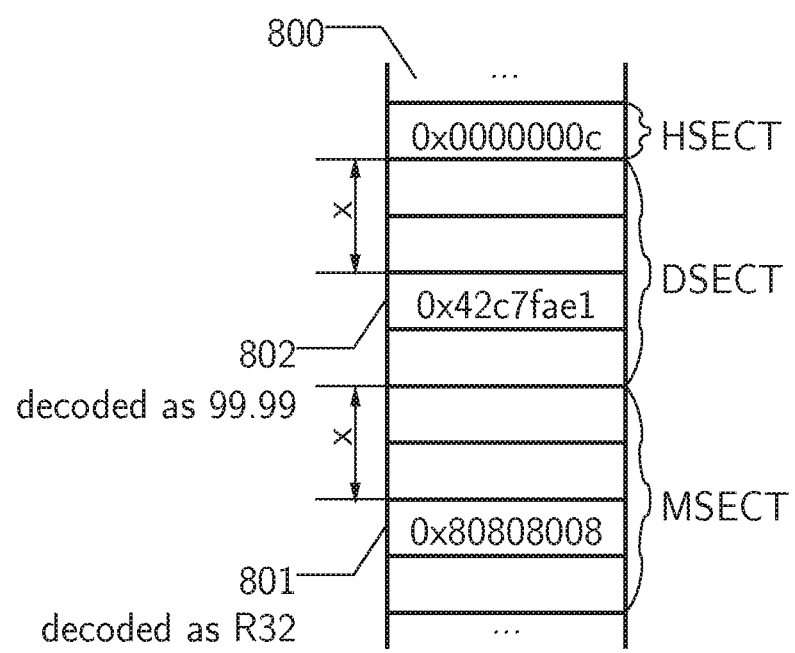
FIG. 8 illustrates an encoding of a data object and its metadata in accordance with an example embodiment of the invention. The metadata encoded in a MSECT can be used to decode a bit sequence in a DSECT.

FIG. 8 illustrates that an example encoding of a data object and its metadata in the present invention. The metadata encoded in a MSECT can be used to decode the bit sequence in a DSECT. For example, 0x80808008 (801) at the offset x in the MSECT is decoded as R32, and thus the 32-bit value (802) at the offset x in the DSECT is the binary encoding of a floating-point number. We can hence decode it as a floating pointer number, and the result is 99.9.

Figure 9A:
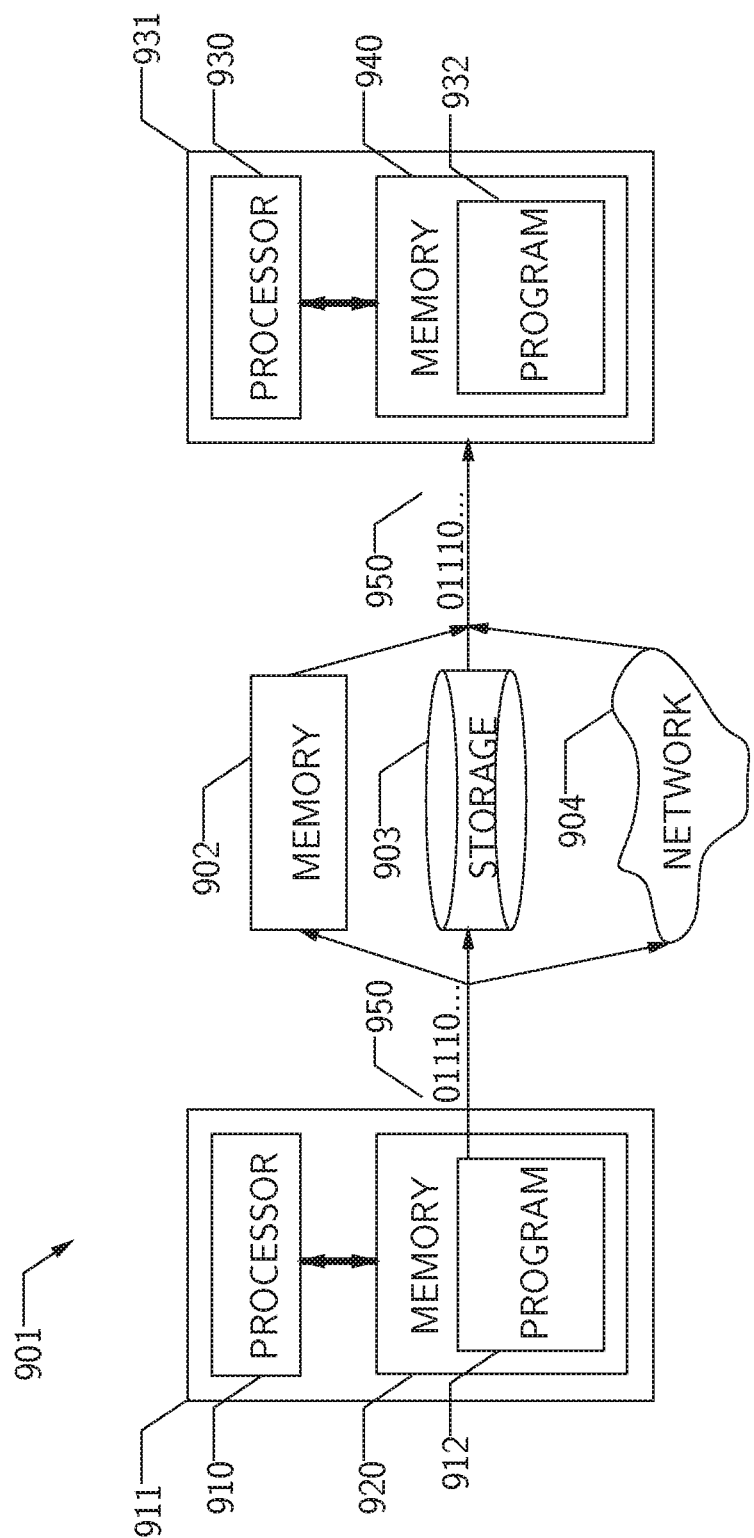
FIG. 9a illustrates a schematic diagram of two computing apparatuses: 911 and 931 that exchange data through shared memory (902), external storage medium (903), or network (904).

FIG. 9a illustrates a schematic diagram of two computing apparatuses 911 and 931 that exchange data through shared memory 902, external storage medium 903, and/or network 904.

The computing apparatus 911 comprises of a processor 910 and a memory 920 coupled to the processor 910. The memory 920 stores a program 912 and its data. In one example embodiment, the program 912 is assumed to include program instructions that, when executed by the associated processor 910, creates a data object in the memory 920 and serializes the object into a bit sequence 950, and stores the bit sequence in the shared memory 902 or the external storage medium 903, or transmits the bit sequence 950 through the network 904.

The computing apparatus 931 comprises of a processor 930 and a memory 940 coupled to the processor 930. The memory 940 stores a program 932. In one example embodiment, the program 932 is assumed to include program instructions that, when executed by the associated processor 930, reads the bit sequence 950 from the shared memory 902 or the external storage medium 903, or receives the bit sequence 950 from the network 904 and deserializes the bit sequence as a semantically identical clone of the original object in the memory 920.

Figure 9B:
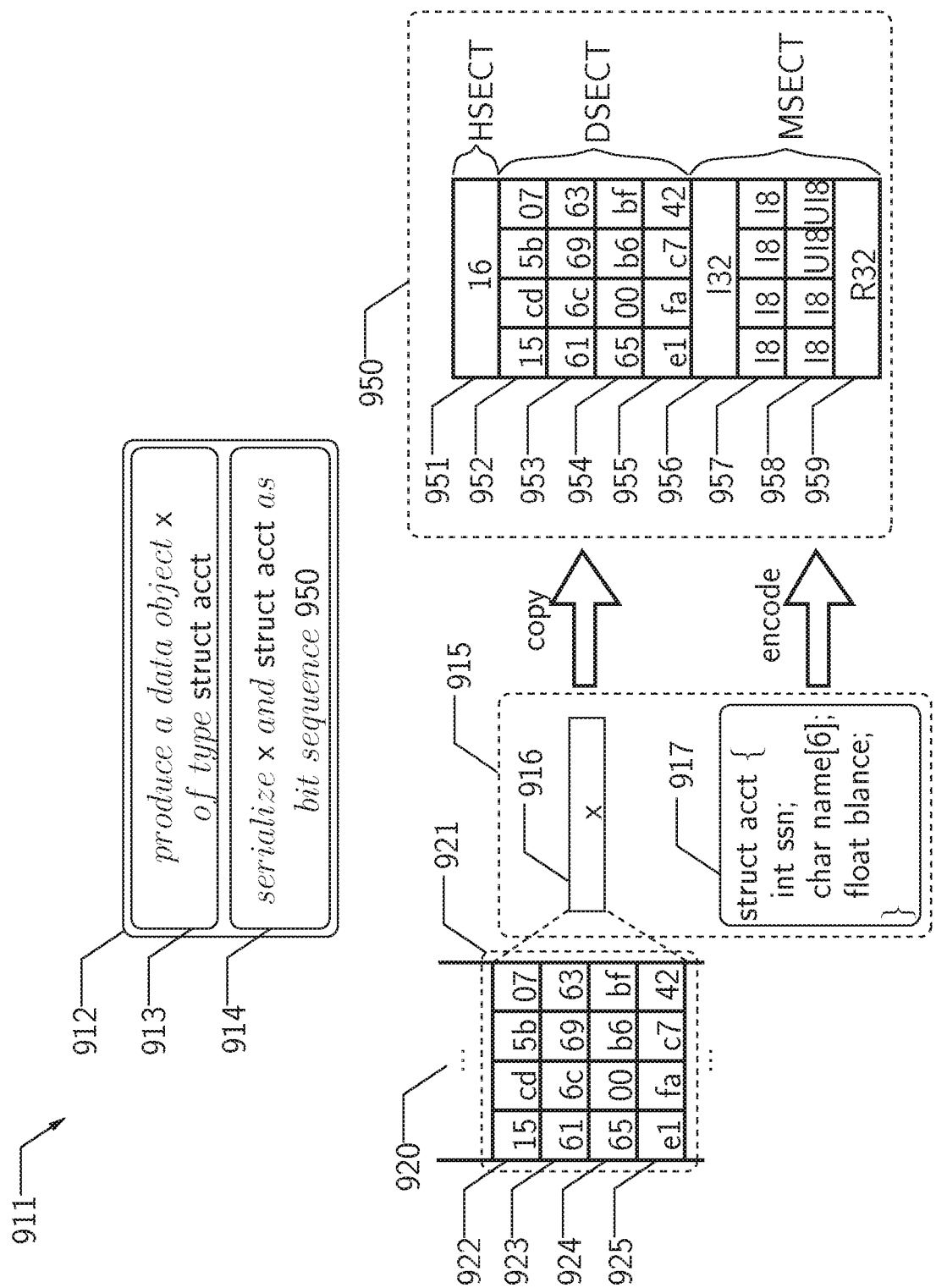
FIG. 9b illustrates an example of encoding a data object and its metadata into a bit sequence in the computing apparatus 911 in accordance with one example embodiment of the invention.

FIG. 9b illustrates an example of encoding a data object and its metadata into a bit sequence in the computing apparatus 911 in accordance with one example embodiment of the invention. In FIG. 9b, a program 912 is executed by a processor 910, and memory 920 is a memory of the run-time environment of 912 in an execution. Program 912 has two parts: (1) a part 913 produces a data object 916 ("x") of type 917 ("struct acct") and (2) a part 914 serializes data object 916 and its type 917 by copying the in-memory representation (921) of data object 916 to the DSECT of box 950, encoding its type 917 as the MSECT of 950, and encoding the size of the DSECT in 951. Box 950 shows a bit sequence encoding data object 916 and its type 917.

Figure 9C:
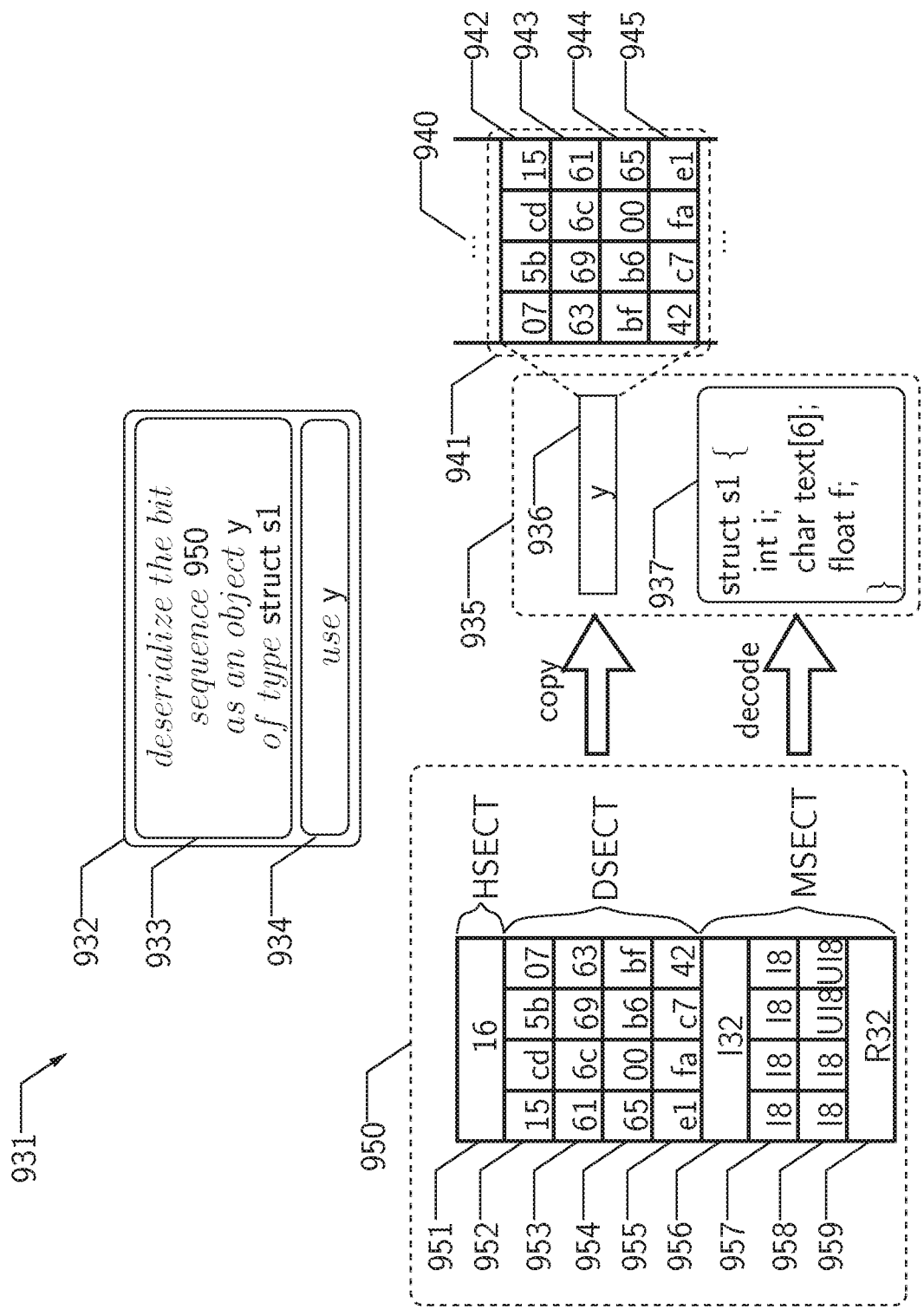
FIG. 9c illustrates an example of decoding a bit sequence as a data object in the computing apparatus 931 in accordance with one example embodiment of the invention.

FIG. 9c illustrates an example of decoding a bit sequence as a data object in the computing apparatus 931 in accordance with one example embodiment. In FIG. 9c, a program 932 is executed by 930, and memory 920 is a memory of the run-time environment of program 932 in an execution. Program 932 has of two parts: (1) a part 933 decodes a MSECT of the bit sequence 950 as the type 937 ("struct s1") and copies the DSECT of 950 to the memory 940 as the object 936 ("y") and (2) a part 934 uses the data object "y."

The type 937 ("struct s1") shown in FIG. 9c is semantically equivalent to the type 917 ("struct acct") shown in FIG. 9b. The object 936 ("y") shown in FIG. 9c is semantically equivalent to the object 916 ("x") in FIG. 9b.

Homogeneous systems that share the same in-memory representation of the type "struct acct" can directly reconstruct the object "x" by copying the DSECT to their memory. Heterogeneous systems that do not share the same in-memory representation of the type "struct acct" can convert the representation in the DSECT to its representation by checking the metadata encoded in the MSECT.

If an encoded data object is an array of primitive values, the MSECT may not be necessary. In an embodiment of the present invention, the length of the array and the type of the array element can be encoded in a HSECT. The encodings of multiple data objects can be concatenated to form a longer bit sequence.

In one example embodiment, data objects and their metadata are encoded with 4-byte alignment. A technique can also be used to encode data objects and their metadata with a different alignment. For example, in some implementations, data objects and their metadata may be encoded with 8-byte alignment, 16-byte alignment, and so forth. Also, a HSECT can be any size. Further, in this specific implementation, a DSECT is ahead of MSECTs. In other embodiments, the order of DSECT and MSECT can be reversed and MSECTs is ahead of a HSECT.

Figure 10:
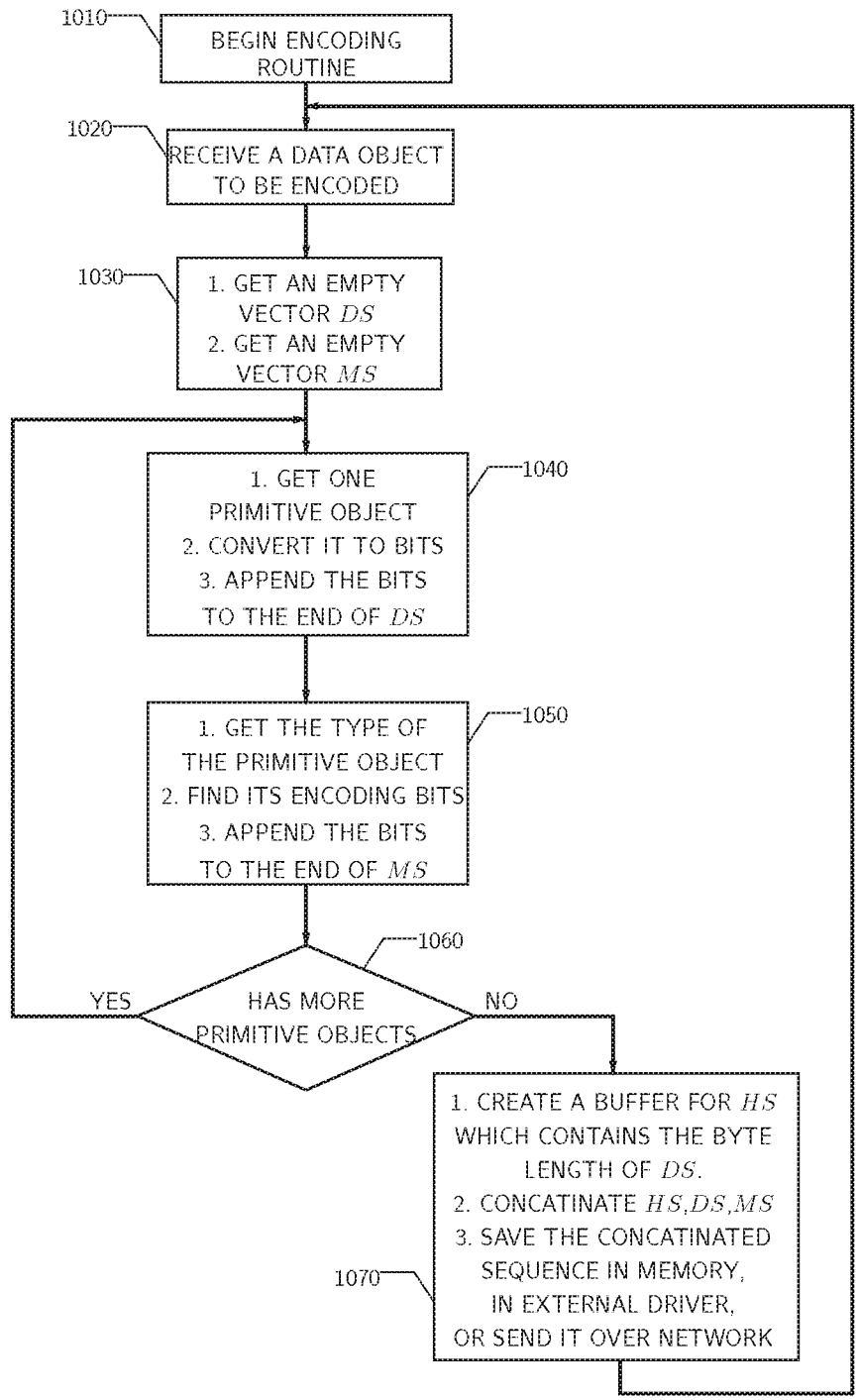
FIG. 10 illustrates a flow chart of a routine for encoding data objects and their metadata for data serialization.

FIG. 10 illustrates a flow chart of a routine for encoding data objects and their metadata for data serialization. The routine begins at the block 1010 and proceeds to the block 1020 where data objects to be encoded is received. At the block 1030, two empty vectors are created: one is given the name DS and the other is given the name MS.

At a block 1040, a primitive object is encoded in three steps: (1) gets one primitive data object from the data object to be encoded, (2) encodes the primitive data object in a bit sequence that can be the in-memory representation of the primitive data object, and (3) appends the bit sequence to the end of DS. An object of a primitive type is a primitive object.

At the block 1050, the metadata of the primitive data object is encoded in three steps: (1) gets the type of the primitive data object, (2) finds the encoding bit sequence of the type that has the same length as the bit sequence of the primitive data object, and (3) appends the bit sequence to the end of MS.

At a block 1060, if there are more primitive data objects to be encoded, the process flow returns to blocks 1040 and 1050. The procedure is repeated until all primitive objects, which compose the data object, have been encoded.

Once all primitive data objects have been encoded, a HS buffer is created to hold the byte size of DS at the block 1070, and all of the bit sequences in HS, DS, and MS are concatenated as one bit sequence. The bit sequence can be kept in memory, stored in external storage medium, and/or sent to other applications over a network. The encoding routine then proceeds back to block 1020 and is repeated to receive and encode more data objects.

Figure 11:
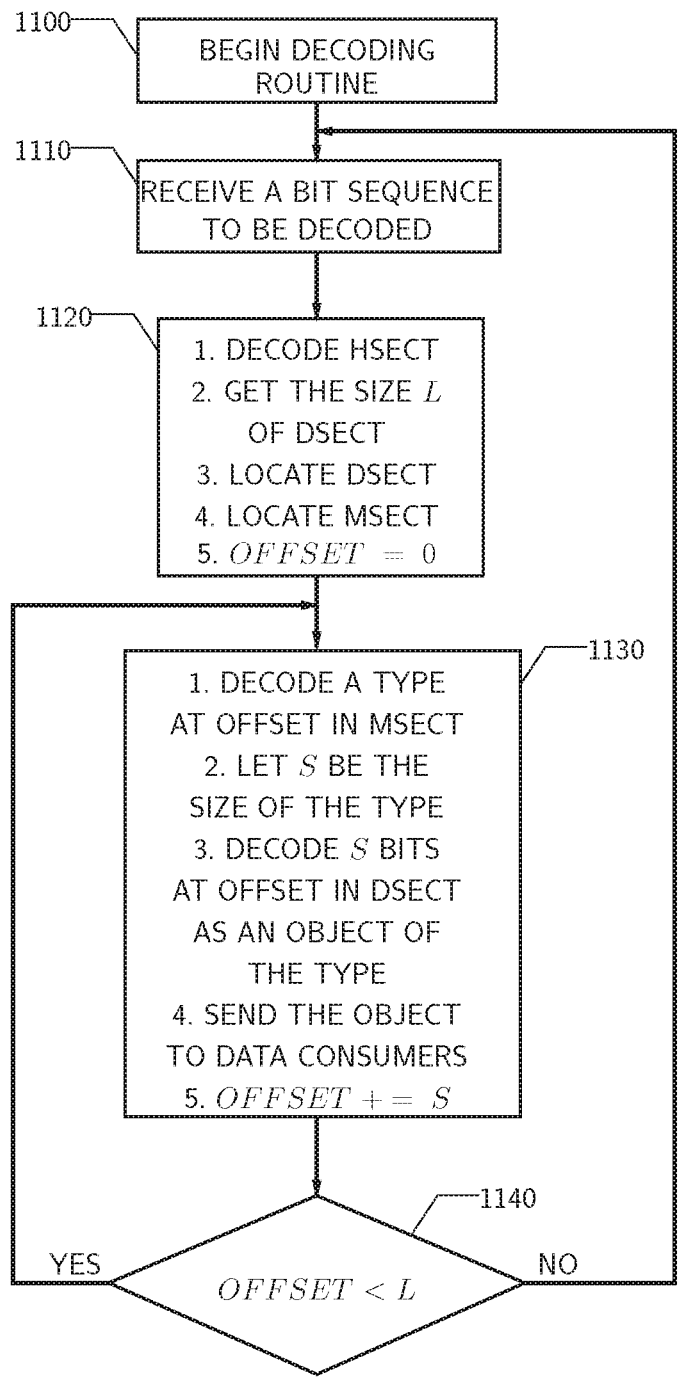
FIG. 11 illustrates a flow chart of a routine for decoding data objects and their metadata for data serialization.

FIG. 11 illustrates a flow chart of a routine for decoding data objects and their metadata for data serialization.

The routine begins at a block 1100 and proceeds to a block 1110 where a bit sequence to be decoded is received. At a block 1120, a byte size L of a DSECT is decoded from the HSECT of the bit sequence, and then the positions of the DSECT and a MSECT in the bit sequence are located. The variable OFFSET is set as 0.

A block 1130 includes of five steps: (1) decodes a type encoding at OFFSET in the MSECT, (2) decodes a byte size S of the type, (3) decodes a bit subsequence of the length S at OFFSET in the DSECT as a data object of the type, (4) sends the data object to data consumers, and (5) increases OFFSET by S.

At the block 1140, if OFFSET is less than L, the process flow proceeds back to block 1130 and block 1130 will be repeated. Otherwise, the process flow proceeds back to block 1110 and continues to execute to receive more bit sequences.

Figure 12:
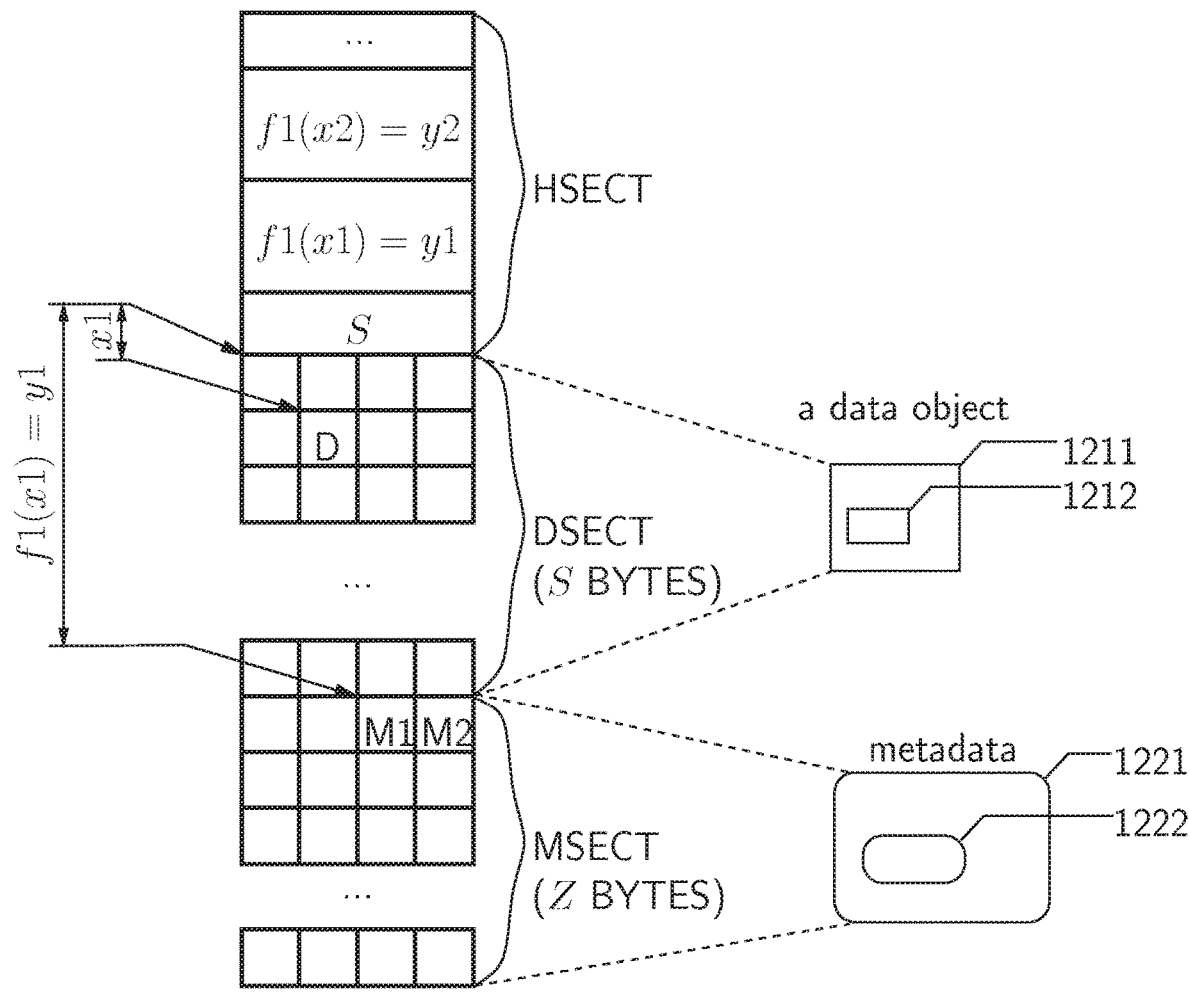
FIG. 12 illustrates an example bit sequence that encodes a data object and its metadata in accordance with an example embodiment of the invention. A set of mapping functions is explicitly encoded in the HSECT of this bit sequence.

FIG. 12 illustrates an example bit sequence that encodes a data object, its metadata in accordance with an example embodiment of the invention. A set of mapping functions is explicitly encoded in the HSECT of this bit sequence. In this embodiment, a bit sequence encoding the metadata of an object is not split to multiple subsections and kept in its consecutive form, therefore a complex irregular mapping function "f1" is used to map the location of a bit sequence that encodes a subobject to the location of a bit sequence that encodes the metadata of the subobject. In this embodiment, the mapping function "f1" is explicitly encoded in the HSECT. In FIG. 12, a data object 1211 is encoded in a S byte DSECT, and its metadata 1221 is encoded in a Z byte MSECT. A subobject 1212 of 1211 is encoded by the bit sequence "D" at the offset "x1," and its metadata 1222 is encoded in "M1M2" at the offset "f1(x1)." The explicit encoding of a mapping function "f1" may be mapped to a common memory region that is shared by any bit sequence that also uses "f1" as its mapping function.

Figure 13:
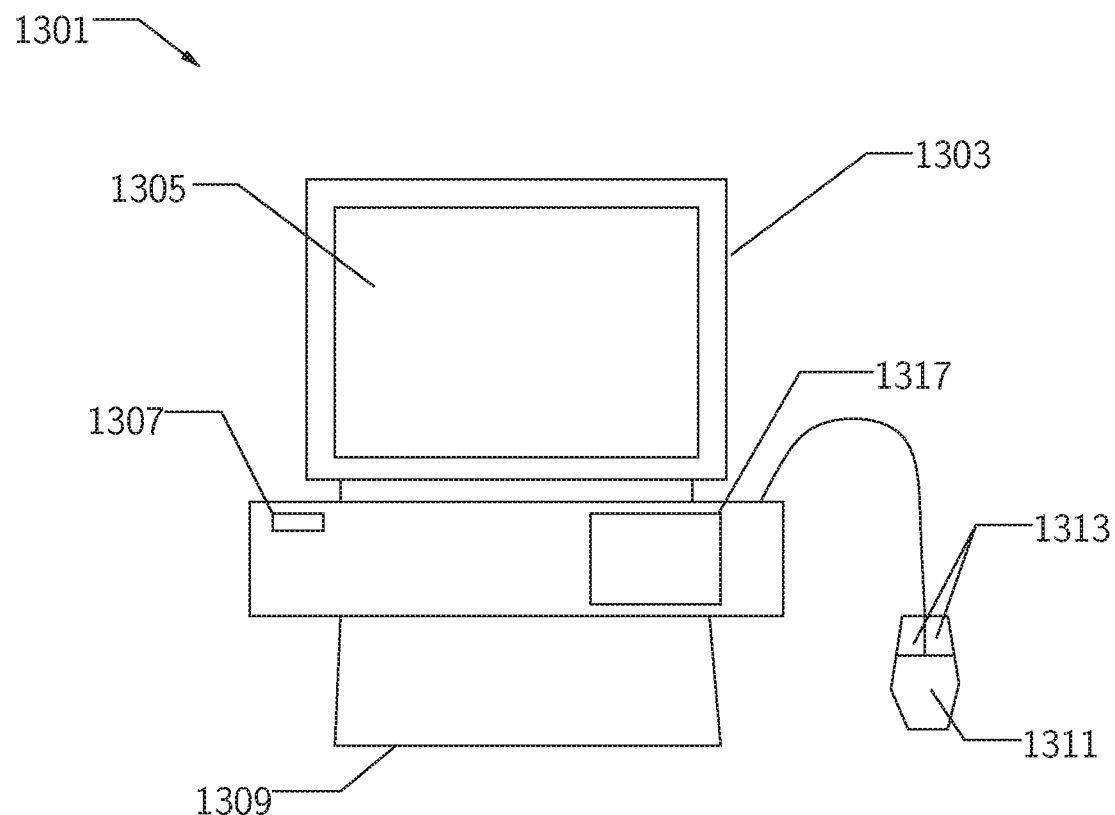
FIG. 13 illustrates a diagram of an example client or computer that can be used in an implementation of the invention.

FIG. 13 illustrates a diagram of an example client or computer that can be used in an implementation of the invention. In an embodiment, a computer program product comprising a computer-readable medium bearing computer program code embodied therein for use with a computer, such as shown in FIG. 13. FIG. 13 shows a computer system 1301 that includes a monitor 1303, screen 1305, enclosure 1307, keyboard 1309, and mouse 1311. Mouse 1311 may have one or more buttons such as mouse buttons 1313. Enclosure 1307 (may also be referred to as a system unit, cabinet, or case) houses familiar computer components, some of which are not shown, such as a processor, memory, mass storage devices 1317, and the like.

Mass storage devices 1317 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1317. The source code of the software of the present invention may also be stored or reside on mass storage device 1317 (e.g., hard disk, magnetic disk, tape, or CD-ROM). As a further example, code of the invention may be transmitted via wires, radio waves, or through a network such as the Internet.

Figure 14:
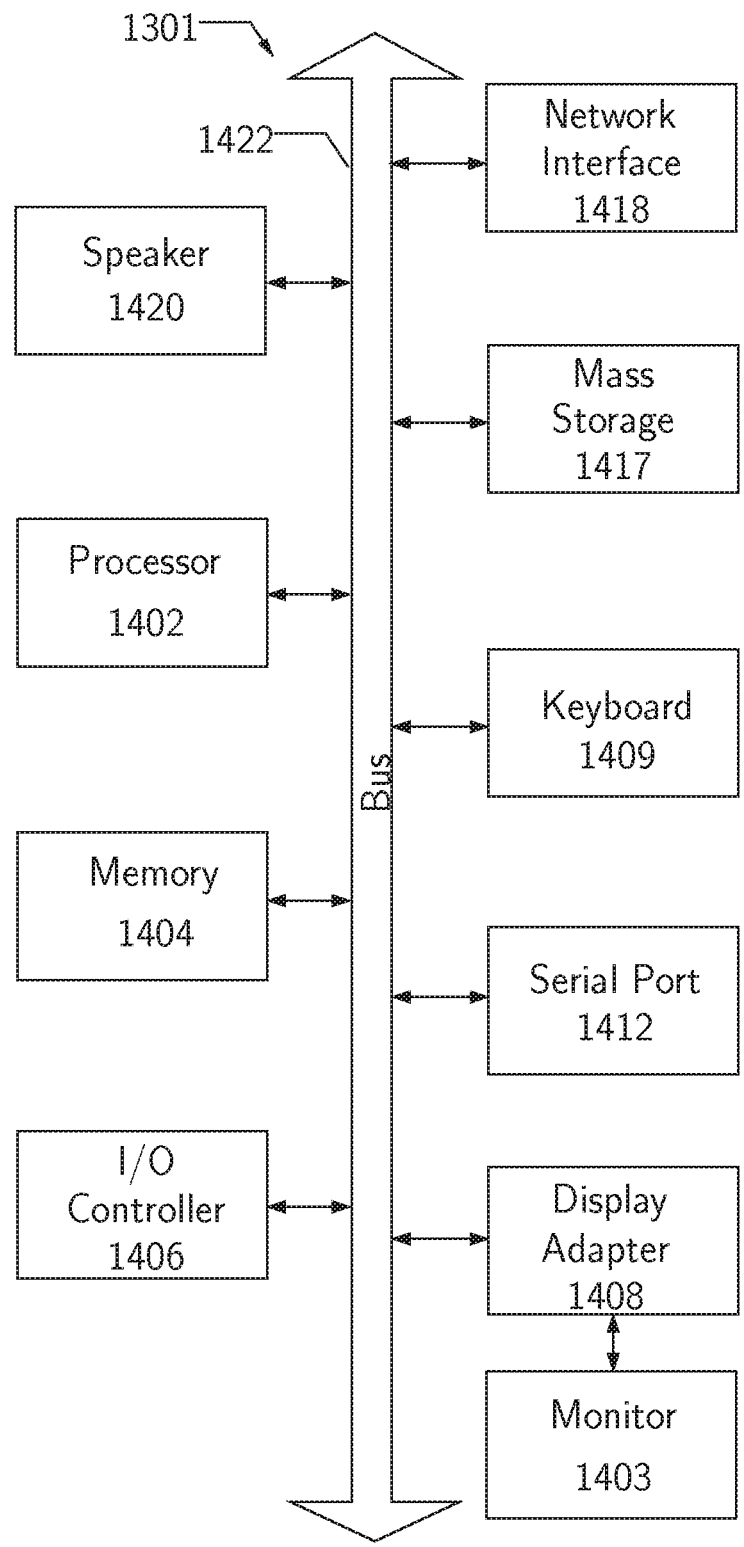
FIG. 14 illustrates a simplified system block diagram of a computer system that can be used to execute software of the invention.

FIG. 14 illustrates a simplified system block diagram of a computer system 1301 used to practice the present invention. As in FIG. 13, computer system 1301 includes monitor 1303, keyboard 1309, and mass storage devices 1317. Computer system 1301 further includes subsystems such as central processor 1402, system memory 1404, input/output (I/O) controller 1406, display adapter 1408, serial or universal serial bus (USB) port 1412, network interface 1418, and speaker 1420. The invention may also be used with computer systems with additional or fewer subsystems. For example, a computer system could include more than one processor 1402 (i.e., a multiprocessor system) or the system may include a cache memory.

The processor may be a dual core, quad core, or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network. Some examples of distributed computer systems for solving problems over the Internet include Folding@home, SETI@home, and the Great Internet Mersenne Prime Search (GIMPS).

Arrows such as 1422 represent the system bus architecture of computer system 1301. However, these arrows are illustrative of any interconnection scheme serving to link the subsystems. For example, speaker 1420 could be connected to the other subsystems through a port or have an internal connection to central processor 1402. Computer system 1301 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, ML, Ocaml, C#, Pascal, Fortran, Perl, Matlab (from MathWorks, Inc.), SAS, SPSS, Java, JavaScript, and others. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be one of the Microsoft Windows) family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method to make loading and storing of metadata faster comprising:
    receiving a first intermediate language code that is a conversion of computer source code, wherein the first intermediate language code comprises a plurality of metadata generated during the conversion of the computer source code; and
    using a computer processor, rewriting the first intermediate language code into a second intermediate language code comprising:
        writing, into the second intermediate language code, code to reserve a first header section in a computer memory for a first data object, specified in the first intermediate language code, wherein the first data object has a first size and is associated with first metadata of the plurality of metadata;
        writing, into the second intermediate language code, code to reserve a first metadata section having a second size in the computer memory;
        writing, into the second intermediate language code, code to reserve a second metadata section having a third size in the computer memory, wherein the second metadata section was not reserved by code in the first intermediate language code;
        writing, into the second intermediate language code, code to store the first metadata into the first and second metadata sections in the computer memory; and
        writing, into the second intermediate language code, code to load the first metadata from the first and second metadata sections in the computer memory, wherein the second size is the same as the first size, and the third size is the same as the first size.

2. The method of claim 1 further comprising: generating executable code from the second intermediate language code.

3. The method of claim 1 wherein the first intermediate language code comprises a conversion of computer machine code.

4. The method of claim 2, further comprising performing runtime checking during execution of the generated executable code.

5. The method of claim 1 further comprising:
writing, into the second intermediate language code, code to store the first size into the header section.

6. The method of claim 1 wherein the first header section is reserved in the computer memory before the first data object, the first metadata section is reserved in the computer memory after the first data object, and the second metadata section is reserved in the computer memory after the first metadata section.

7. The method of claim 1 wherein the first header section is reserved in the computer memory at a location before the first data object, the first metadata section is reserved in the computer memory at a location before the first header section, and the second metadata section is reserved in the computer memory at a location before the first metadata section.

8. The method of claim 1 further comprising:
when writing the second intermediate language code, referring to a look-up table comprising rules to convert one or more instructions found in the first intermediate language code to one or more corresponding instructions for the second intermediate language code.

9. The method of claim 1 further comprising:
encoding an n-bit value type of the first intermediate language code as at most n bits in the second intermediate language; and
encoding an n-bit uninitialized memory type of the first intermediate language code as at most n bits in the second intermediate language.

10. The method of claim 9 further comprising:
reserving a unique bit pattern in the first 8 bits of a type encoding, wherein the unique bit pattern for the first 8 bits is different from a bit pattern used for a remainder of bits in the type encoding.

11. The method of claim 9 further comprising:
reserving a unique bit pattern in the last 8 bits of a type encoding, wherein the unique bit pattern for the last 8 bits is different from a bit pattern used for a remainder of bits in the type encoding.

12. A method of detecting a buffer overrun situation or a type error situation by using code according to the method of claim 1.

13. The method of claim 1 further comprising:
rewriting a v1=malloc(v2) instruction of the first intermediate language code to instructions of the second intermediate language code comprising v0=malloc(X+Y*v2), wherein X and Y are integers.

14. The method of claim 13 wherein the rewriting a v1=malloc(v2) instruction of the first intermediate language code to instructions of the second intermediate language code comprises storing (v0,X,v2) and v1=v0+X.

15. A method of rewriting a first intermediate language code into a second intermediate language code using a computer processor and making loading and storing of metadata faster, comprising:

writing, into the second intermediate language code, code to reserve a first header section in a computer memory for a first data object, specified in the first intermediate language code, wherein the first data object has a first size and is associated with a first metadata of a plurality of metadata associated with the first intermediate language code;
writing, into the second intermediate language code, code to reserve a first metadata section having a second size in the computer memory;
writing, into the second intermediate language code, code to reserve a second metadata section having a third size in the computer memory, wherein the second metadata section was not reserved by code in the first intermediate language code;
writing, into the second intermediate language code, code to store the first metadata into the first and second metadata sections; and
writing, into the second intermediate language code, code to load the first metadata from the first and second metadata sections in the computer memory, wherein the second size is the same as the first size, and the third size is the same as the first size.

16. The method of claim 15 wherein a data subobject at a offset in the first data object is separated from a first data subobject metadata, associated with the data subobject, in the first metadata section by a second offset, and
the first data subobject metadata is separated from a second data subobject metadata, associated with the data subobject, in the second metadata section by a third offset.

17. The method of claim 16 wherein the first offset is equal to the second offset, and the first offset is equal to the third offset.

18. The method of claim 17 further comprising:
writing, into the second intermediate language code, code to store the first size into the header section.

19. The method of claim 16 wherein the first offset is not equal to the second offset, and the first offset is not equal to the third offset.

20. The method of claim 19 further comprising:
writing, into the second intermediate language code, code to store a first function into the header section, wherein using the first function, given the first offset, the first function provides the second offset; and
writing, into the second intermediate language code, code to store a second function into the header section, wherein using the second function, given the first offset, the second function provides the third offset.

21. The method of claim 15 further comprising:
writing, into the second intermediate language code, code to reserve a third metadata section;
writing, into the second intermediate language code, code to store the first metadata into the third metadata section; and
writing, into the second intermediate language code, code to load the first metadata from the third metadata section.

22. A system for compiling source code to make loading and storing of metadata faster, comprising:
at least one processor; and
a memory comprising instructions, the instructions being executable by the at least one processor to at least:
receive source code, and generate first intermediate language code based on the source code received;

receive the generated first intermediate language code, and generate second intermediate language code from the first intermediate language code, write, into the second intermediate language code, code to reserve a first header section for a first data object, specified in the first intermediate language code, wherein the first data object has a first size and is associated with first metadata of the plurality of metadata, write, into the second intermediate language code, code to reserve a first metadata section having a second size, write, into the second intermediate language code, code to reserve a second metadata section having a third size; and receive the generated second intermediate language code, and generate executable code, wherein the second size is the same as the first size, and the third size is the same as the first size.

23. The system of claim 22 wherein the instructions are executable by the at least one processor to further write, into the second intermediate language code, code to store the first metadata into the first and second metadata sections.

24. A method for compiling source code to make loading and storing of metadata faster, comprising:

receiving a data object of computer software code, wherein the data object comprises a first size;

using a computer processor, encoding the data object comprising:

reserving a data section starting at a first location in a computer memory and ending at a second location in the computer memory, wherein the data section, from the first location to the second location, comprises a second size that is at least equal to the first size;

reserving a first metadata section, associated with the data object, starting at a third memory location, antecedent in the computer memory to the first location, and ending at a fourth location in the computer memory, wherein the first metadata section, from the third location to the fourth location, comprises a third size; and reserving a header section starting at a fifth location in the computer memory, after the fourth location, wherein the header section comprises a value equal to the second size, wherein the third size is the same as the second size.

25. A system for compiling source code to make loading and storing of metadata faster, comprising:

at least one processor; and a memory comprising instructions, the instructions being executable by the at least one processor to at least:

receive executable machine code, and generate first intermediate language code based on the machine code received;

receive the generated first intermediate language code, and generate second intermediate language code from the first intermediate language code, write, into the second intermediate language code, code to reserve a first header section for a first data object, specified in the first intermediate language code, wherein the first data object has a first size and is associated with first metadata of the plurality of metadata, write, into the second intermediate language code, code to reserve a first metadata section having a second size, write, into the second intermediate language code, code to reserve a second metadata section having a third size;

receive the generated second intermediate language code; and compile the second intermediate language code to obtain executable code, wherein the second size is the same as the first size, and the third size is the same as the first size.

* * * * *